US009403514B2

(12) United States Patent
Takeuchi et al.

(10) Patent No.: US 9,403,514 B2
(45) Date of Patent: Aug. 2, 2016

(54) BRAKE CONTROL DEVICE FOR VEHICLE

(71) Applicants: ADVICS CO., LTD., Kariya (JP); TOYOTA JIDOSHA KABUSHIKI KAISHA, Aichi-ken (JP)

(72) Inventors: Kiyohito Takeuchi, Nagoya (JP); Yoshio Masuda, Kariya (JP); Masaaki Komazawa, Miyoshi (JP); Yusuke Kamiya, Okazaki (JP)

(73) Assignees: ADVICS CO., LTD., Kariya, Aichi-Pref (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/394,563

(22) PCT Filed: Jun. 25, 2013

(86) PCT No.: PCT/JP2013/067398
§ 371 (c)(1),
(2) Date: Oct. 15, 2014

(87) PCT Pub. No.: WO2014/003009
PCT Pub. Date: Jan. 3, 2014

(65) Prior Publication Data
US 2015/0127226 A1    May 7, 2015

(30) Foreign Application Priority Data

Jun. 26, 2012 (JP) ................................. 2012-142672

(51) Int. Cl.
*B60T 8/17* (2006.01)
*B60T 8/32* (2006.01)
(Continued)

(52) U.S. Cl.
CPC . *B60T 8/17* (2013.01); *B60T 7/042* (2013.01); *B60T 8/1755* (2013.01); *B60T 8/3265* (2013.01);
(Continued)

(58) Field of Classification Search
None
See application file for complete search history.

(56) References Cited

U.S. PATENT DOCUMENTS 5,967,628 A * 10/1999 Abe ........................ B60T 7/12
188/353
2007/0210642 A1    9/2007 Niino et al.

FOREIGN PATENT DOCUMENTS

JP    2000-203402 A    7/2000
JP    2000-223312 A    8/2000
(Continued)

OTHER PUBLICATIONS

International Search Report (PCT/ISA/210) mailed on Aug. 6, 2013, by the Japanese Patent Office as the International Searching Authority for International Application No. PCT/JP2013/067398.

*Primary Examiner* — Mussa A Shaawat
*Assistant Examiner* — Kyung Kim
(74) *Attorney, Agent, or Firm* — Buchanan Ingersoll & Rooney PC

(57) ABSTRACT

A brake control device for a vehicle which can prevent occurrence of hunting or stepping during braking control operation and includes a pressure increasing or decreasing characteristic selecting portion which selects a pressure increasing characteristic when a target wheel cylinder pressure increases continuously for a predetermined operation judgment period and selects a pressure decreasing characteristic when the target wheel cylinder pressure decreases continuously for a predetermined operation judgment period. The brake control device further includes an output servo pressure setting portion which sets a target servo pressure based on the pressure increasing or decreasing characteristic selected by the pressure increasing or decreasing characteristic selecting portion and a servo pressure generating device which generates a servo pressure based on the target servo pressure.

7 Claims, 10 Drawing Sheets

(51) Int. Cl.
    *B60T 8/1755* (2006.01)
    *B60T 13/66* (2006.01)
    *B60T 13/58* (2006.01)
    *B60T 8/40* (2006.01)
    *B60T 7/04* (2006.01)
    *B60T 13/14* (2006.01)
    *B60T 13/68* (2006.01)

(52) U.S. Cl.
    CPC ............ *B60T 8/4077* (2013.01); *B60T 13/146* (2013.01); *B60T 13/58* (2013.01); *B60T 13/66* (2013.01); *B60T 13/662* (2013.01); *B60T 13/686* (2013.01)

(56) References Cited

FOREIGN PATENT DOCUMENTS

| | | |
|---|---|---|
| JP | 2002-316631 A | 10/2002 |
| JP | 2006-21752 A | 1/2006 |
| JP | 2007-230378 A | 9/2007 |
| JP | 2010-143543 A | 7/2010 |
| JP | 2011-156998 A | 8/2011 |
| JP | 2012-16984 A | 1/2012 |
| JP | 2012-020707 A | 2/2012 |
| JP | 2012-71681 A | 4/2012 |

* cited by examiner

BRAKE CONTROL DEVICE FOR VEHICLE

TECHNICAL FIELD

This invention relates to a brake control device for a vehicle which applies braking force to the vehicle by controlling hydraulic brake pressure.

BACKGROUND ART

As an example of a brake control device for a vehicle, a master cylinder device described in a Patent Literature 1 has been known. The master cylinder device according to the Patent Literature 1 pressurizes the operation fluid by a forward movement of a pressure piston in response to a braking operation by an operator of the vehicle. The pressurized operation fluid is supplied to a braking device (wheel brake cylinder) installed in each vehicle wheel thereby to apply each vehicle wheel with a braking force. A sealing member is disposed between the housing of the master cylinder body and the pressure piston for liquid-tightly sealed the housing and the pressure piston thereby.

Further, the master cylinder device of the Patent Literature 1 includes a mechanical type open/close valve and the plunger portion of the open/close valve is slidably fitted in a housing of the open/close valve at a base bottom portion. The master cylinder device supplies the master cylinder with a highly pressurized operation fluid via the open/close valve. Another sealing member is provided between the housing of the open/close valve and the base bottom portion of the plunger to liquid-tightly seal therebetween.

CITATION LIST

Patent Literature

Patent literature 1: JP2012-016984 A

SUMMARY OF INVENTION

Technical Problem(s)

However, according to the master cylinder device of the Patent Literature 1, since the sealing member is provided between the housing of the master cylinder body and the pressure piston, a sliding resistance force is generated when the pressure piston moves. Due to such sliding resistance force, a hysteresis is generated between the pressure increasing characteristics upon master cylinder pressure increasing operation and the pressure decreasing characteristics upon master cylinder pressure decreasing operation. Further, since another sealing member is provided between the housing of the open/close valve and the plunger of the open/close valve, a sliding resistance force is generated when the plunger moves. Accordingly, another hysteresis is generated between the pressure increasing characteristics upon pressure increasing operation of the operation fluid supplied to the master cylinder and the pressure decreasing characteristics upon pressure decreasing operation of the operation fluid supplied to the master cylinder. Such hysteresis may be a cause of hunting or stepping of control of operation fluid to be supplied to the master cylinder.

Accordingly, this invention was made in consideration with the above-mentioned situation and the objective of the invention is to provide a brake control device for a vehicle which can prevent hunting or stepping generation during the control operation fluid to be supplied to the master cylinder.

Solution to Problem(s)

The brake control device for a vehicle according to a first aspect of the invention includes a master piston slidably and liquid-tightly engaged with a main cylinder of a master cylinder and forming a master chamber together with the main cylinder to supply a plurality of wheel cylinders with a master pressure, a servo pressure generating device generating a servo pressure necessary for generating the master pressure in the master chamber by supplying the generated servo pressure to a servo chamber formed between the master piston and an inner wall portion of the main cylinder and biasing the master piston forwardly, a target wheel cylinder pressure setting portion for setting a target wheel cylinder pressure which is a target value of the master pressure and a target servo pressure setting portion for setting a target servo pressure necessary for generating the target wheel cylinder pressure, wherein the target servo pressure setting portion includes a pressure increasing or decreasing characteristic selecting portion for selecting a pressure increasing characteristic which defines the servo pressure necessary for increasing the target wheel cylinder pressure and a pressure decreasing characteristic which defines the servo pressure necessary for decreasing the target wheel cylinder pressure and an output servo pressure setting portion for setting an output servo pressure generated by the servo pressure generating device and wherein the pressure increasing or decreasing characteristic selecting portion selects the pressure increasing characteristic when the target wheel cylinder pressure continuously increases for a predetermined operation judgment period and selects the pressure decreasing characteristic when the target wheel cylinder pressure continuously decreases for a predetermined operation judgment period and the output servo pressure setting portion sets the target servo pressure based on the pressure increasing or decrease characteristic selected by the pressure increasing or decreasing characteristic selecting portion. The vehicle brake control device is further characterized in that the servo pressure generating device generates the servo pressure based on the target servo pressure.

The brake control device for a vehicle according to a second aspect of the invention includes a master piston slidably and liquid-tightly engaged with a main cylinder of a master cylinder and forming a master chamber together with the main cylinder to supply a plurality of wheel cylinders with a master pressure, a servo pressure generating device generating a servo pressure necessary for generating the master pressure in the master chamber by supplying the generated servo pressure to a servo chamber formed between the master piston and the main cylinder and biasing the master piston forwardly, a target wheel cylinder pressure setting portion for setting a target wheel cylinder pressure which is a target value of the master pressure and a target servo pressure setting portion for setting a target servo pressure necessary for generating the target wheel cylinder pressure, wherein the target servo pressure setting portion includes an output servo pressure setting portion for setting an output servo pressure generated by the servo pressure generating device and the output servo pressure setting portion sets the target servo pressure based on the target wheel cylinder pressure and calculates a filtered target servo pressure obtained by filtering the target servo pressure wherein the filtered target servo pressure is set to be the output servo pressure. The vehicle brake control device is further characterized in that the servo pressure generating device generates the servo pressure based on the output servo pressure.

The brake control device for a vehicle according to third aspect of the invention is characterized in that in the brake control device according to the second aspect, the target servo pressure setting portion further includes a pressure increasing or decreasing characteristic selecting portion for selecting a pressure increasing characteristic which defines the servo pressure necessary for increasing the target wheel cylinder pressure and a pressure decreasing characteristic which defines the servo pressure necessary for decreasing the target wheel cylinder pressure wherein the output servo pressure setting portion sets the target servo pressure based on the target wheel cylinder pressure and the pressure increasing or decreasing characteristic selected by the pressure increasing or decreasing characteristic selecting portion.

The brake control device for a vehicle according to a fourth aspect of the invention is characterized in that in the brake control device according to the second or the third aspect, the output servo pressure setting portion sets a servo pressure calculated based on the target servo pressure as the output servo pressure when a deviation between the target servo pressure and the filtered target servo pressure is equal to or more than a predetermined threshold value and sets the filtered target servo pressure as the output servo pressure when the deviation between the target servo pressure and the filtered target servo pressure is less than the predetermined threshold value.

The brake control device for a vehicle according to a fifth aspect of the invention is characterized in that in the brake control device according to the above second through fourth aspects, the output servo pressure setting portion calculates the filtered target servo pressure by filtering the target servo pressure using a low pass filter.

The brake control device for a vehicle according to a sixth aspect of the invention is characterized in that in the brake control device according to the first aspect, or any of the third through fifth aspects, the brake control device further includes a vehicle posture control portion which controls a posture of the vehicle by adjusting a vehicle braking force by instructing the target wheel cylinder pressure to the target wheel cylinder pressure setting portion and the pressure increasing or decreasing characteristic selecting portion selects the pressure increasing characteristic although within the predetermined operation judgment period, when the instruction from the vehicle posture control portion requests pressure increasing for the target wheel cylinder pressure and selects the pressure decreasing characteristic although within the predetermined operation judgment period, when the instruction from the vehicle posture control portion requests a pressure decrease for the target wheel cylinder pressure.

The brake control device for a vehicle according to a seventh aspect of the invention is characterized in that in the brake control device according to the first aspect or any one of the third through fifth aspects, the pressure increasing or decreasing characteristic selecting portion selects the pressure increasing characteristic when the target wheel cylinder pressure is increased from zero state.

According to the invention of the brake control device for a vehicle associated with the first aspect, the pressure increasing or decreasing characteristic selecting portion selects the pressure increasing characteristic when the target wheel cylinder pressure continuously increases for a predetermined operation judgment period and selects the pressure decreasing characteristic when the target wheel cylinder pressure continuously decreases for a predetermined operation judgment period. Accordingly, the switching over operation between the pressure increasing characteristic and pressure decreasing characteristic can be performed when the target wheel cylinder pressure is in continuous pressure increasing tendency or in continuous pressure decreasing tendency. Thus, an unnecessary switching over operation between the pressure increasing and decreasing characteristics due to periodical fluctuation can be prevented and as a result, generation of hunting or stepping in servo pressure control can be minimized.

According to the invention of the brake control device for a vehicle associated with the second aspect, the output servo pressure setting portion sets the target servo pressure based on the target wheel cylinder pressure and calculates a filtered target servo pressure obtained by filtering the target servo pressure whereby the filtered target servo pressure is set to be the output servo pressure. Accordingly, the servo pressure generating device generates the servo pressure based on the filtered target servo pressure. Thus, any pressure fluctuation of the output servo pressure due to turbulence or the like can be avoided.

According to the invention of the brake control device for a vehicle associated with the third aspect, the output servo pressure setting portion sets the target servo pressure based on the target wheel cylinder pressure and the pressure increasing or decreasing characteristic selected by the pressure increasing or decreasing characteristic selecting portion and the output servo pressure setting portion sets the target servo pressure based on the target wheel cylinder pressure and calculates a filtered target servo pressure obtained by filtering the target servo pressure whereby the filtered target servo pressure is set to be the output servo pressure. Thus, an unnecessary switching over operation between the pressure increasing and decreasing characteristics due to turbulence can be prevented, and as a result, generation of hunting or stepping in servo pressure control can be minimized.

According to the invention of the brake control device for a vehicle associated with the fourth aspect, the output servo pressure setting portion sets a servo pressure calculated based on the target servo pressure as the output servo pressure when a deviation between the target servo pressure and the filtered target servo pressure is equal to or more than a predetermined threshold value and sets the filtered target servo pressure as the output servo pressure when the deviation between the target servo pressure and the filtered target servo pressure is less than the predetermined threshold value. Accordingly, if the target servo pressure is desired to be suddenly changed upon an emergency braking request, the servo pressure calculated based on the target servo pressure is set to be the output servo pressure. This can reduce any response delay of braking control operation.

According to the invention of the brake control device for a vehicle associated with the fifth aspect, the output servo pressure setting portion calculates the filtered target servo pressure by filtering the target servo pressure using a low pass filter. Thus, turbulence of high frequency wave such as noise can be easily removed compared to a case of a frequency band area of the target servo pressure.

According to the invention of the brake control device for a vehicle associated with the sixth aspect, the pressure increasing or decreasing characteristic selecting portion selects the pressure increasing characteristic although within the predetermined operation judgment period, when the instruction from the vehicle posture control portion requests a pressure increase for the target wheel cylinder pressure and selects the pressure decreasing characteristic although within the predetermined operation judgment period, when the instruction from the vehicle posture control portion requests a pressure decrease for the target wheel cylinder pressure. Thus, a necessary braking force requested by the vehicle posture control portion can be assured and the vehicle posture control portion can perform vehicle posture control.

According to the invention of the brake control device for a vehicle associated with the seventh aspect, the pressure increasing or decreasing characteristic selecting portion selects the pressure increasing characteristic when the target wheel cylinder pressure is increased from zero state. Therefore, the pressure increasing or decreasing characteristic selecting portion can select the pressure increasing characteristic upon initiation of braking operation. Further, by selecting the pressure decreasing characteristic, any shortage of braking force can be prevented.

DESCRIPTION OF EMBODIMENTS

The embodiments of the present invention will be explained below with reference to the attached drawings. It is noted here that common portions of the embodiments are referenced by the same numerals or symbols and overlapping explanations thereof will be omitted. Each Figure indicates the concept of the embodiment of the invention and does not define the sizes or dimensions of the detail structure.

(1) First Embodiment
<Structure of Brake Control Device for a Vehicle>

Figure 1:
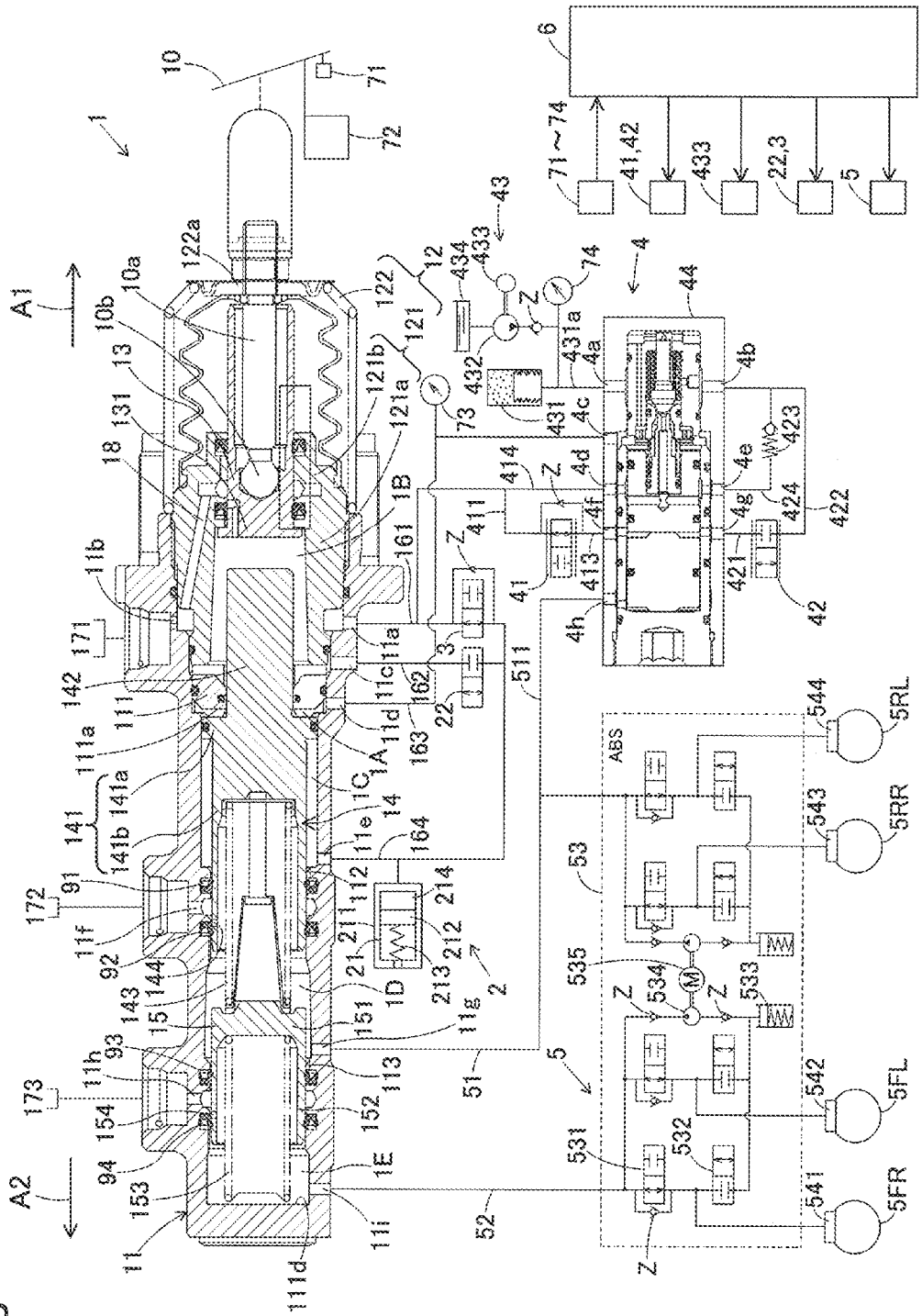
FIG. 1 is a partial sectional-explanatory view illustrating a configuration of a brake control device for a vehicle according to an embodiment.

As illustrated in FIG. 1, the brake control device for a vehicle includes, as the main part, a master cylinder 1, a reaction force generating device 2, a separation lock valve 22, a reaction force valve 3, a servo pressure generating device 4, an ABS actuator 53, wheel cylinders 541 through 544, a brake ECU 6 and various kind of sensors 71 through 74 communicable with the brake ECU 6. In this embodiment, a well-known hybrid ECU (not shown) is to be connected to the brake ECU 6.

(Master Cylinder 1)

The master cylinder 1 supplies the wheel cylinders 541 through 544 with a braking fluid by way of the ABS actuator 53 and is formed mainly by a main cylinder 11, a cover cylinder 12, an input piston 13, a first master piston 14 and a second master piston 15.

The main cylinder 11 is formed in a substantially bottomed cylinder shape having an opening at one end thereof and a bottom surface at the other end. Hereinafter, the master cylinder 1 will be explained while defining the opening side of the main cylinder 11 as a rear (direction shown by an arrow A1) and the bottom surface side thereof as a front (in the arrow A2 direction side). The main cylinder 11 includes therein an inner wall portion 111, which separates the opening side (in the arrow A1 direction side) and the bottom surface side in (in the arrow A2 direction side) of the main cylinder 11. An inner circumferential surface of the inner wall portion 111 is provided with a through-hole 111a at a central portion thereof which penetrates the cylinder through in an axial direction (in a front-rear direction).

The main cylinder 11 includes therein a small diameter portion 112 (front side) and also a small diameter portion 113 (rear side). The inner diameter of the main cylinder 11 is set to be smaller than the rest at these portions which are located forwardly of the inner wall portion 111. In other words, the small diameter portions 112, 113 project from the entire inner circumferential surface of a portion of the main cylinder 11 in an axial direction. The mentioned master pistons 14, 15 which will be explained later, are provided inside the main cylinder 11, while allowing the master pistons 14, 15 to be slidably movable in the axial direction. Ports etc., which interconnect the inside and outside of the main cylinder 11 will be also described later.

The cover cylinder 12 includes a cylinder portion 121 in a substantially cylindrical shape and a cup-shaped compression spring 122. The cylinder portion 121 is arranged at a rear end of the main cylinder 11 and is coaxially fitted into the opening of the main cylinder 11. An inner diameter of a front portion 121a of the cylinder portion 121 is formed to be greater than an inner diameter of a rear portion 121b thereof. Furthermore, the inner diameter of the front portion 121a is formed to be greater than an inner diameter of the through-hole 111a of the inner wall portion 111.

The compression spring 122 is attached to the rear end portion of the main cylinder 11 and an outer circumferential surface of the cylinder portion 121 so as to cover the opening of the main cylinder 11 and a rear end opening of the cylinder portion 121. A flange 122a of an operation rod 10a is formed at a bottom wall of the compression spring 122. The compression spring 122 is made of an elastic material expandable and contractible in the axial direction and the bottom wall thereof is biased in a rearward direction.

The input piston 13 is configured to slidably move inside the cover cylinder 12 in response to an operation of a brake pedal 10. The input piston 13 is formed to be of cylindrical shape having an opening at rear end and a bottom at front end. A bottom wall 131 forming the bottom of the input piston 13 has a diameter larger than the rest of the inner portion thereof. The bottom wall 131 is located at a rear end of the front portion of the cylinder portion 121. The input piston 13 is liquid-tightly disposed in the cylinder 121 at a rear portion 121b and is slidable in an axial direction.

The operation rod 10a of the brake pedal 10 and a pivot 10b are disposed in the input piston 13. The operation rod 10a projects towards the outside through the opening of the input piston 13 and the flange 122a of the compression spring 122, and is connected to the brake pedal 10. The operation rod 10a moves in response to the operation to the brake pedal 10. More specifically, when the brake pedal 10 is depressed, the operation rod 10a advances in a forward direction while pressing the compression spring 122 in the axial direction. As described above, the brake pedal 10 transmits an operating force (depressing force) applied thereto by a driver of the vehicle to the input piston 13. The input piston 13 also advances in response to the forward movement of the operation rod 10a.

The first master piston 14 is arranged within the main cylinder 11 and is slidably movable in the axial direction. More specifically, the first master piston 14 includes a first main body portion 141 and a projection portion 142. The first main body portion 141 is arranged coaxially within the main cylinder 11 at a location forward of the inner wall portion 111. The first main body portion 141 is formed in a substantially bottomed cylinder shape having an opening at a front portion thereof and a flange 141a at a rear portion thereof. In other words, the first main body portion 141 includes the flange 141a and a circumferential wall portion 141b.

The flange 141a is provided inside the main cylinder 11 at a location forward of the inner wall portion 111 in a liquid-tight manner while allowing the flange 141a to be slidably movable in the axial direction. The circumferential wall portion 141b is formed in a cylinder shape having a smaller diameter than the flange 141a and extends coaxially from a front end surface of the flange 141a in the forward direction. A front portion of the circumferential wall portion 141b is provided to be slidably movable in the axial direction relative to the small diameter portion 112 and in liquid-tightly therewith, while allowing the front portion of the circumferential wall portion 141b to be slidably movable in the axial direction relative to the small diameter portion 112. A rear portion of the circumferential wall portion 141b is spaced apart from the inner circumferential surface of the main cylinder 11.

The projection portion 142 is a columnar-shaped portion projecting rearward from a center of a rear end surface of the flange 141a of the first main body portion 141. The projection portion 142 is provided so as to penetrate into the through-hole 111a of the inner wall portion 111 and to be slidably movable in the axial direction. A rear portion of the projection portion 142 projects rearward from the through-hole 111a to the inside of the cylinder portion 121. The rear portion of the projection portion 142 is spaced apart from an inner circumferential surface of the cylinder portion 121. A rear end surface of the projection portion 142 is spaced apart from the bottom wall 131 of the input piston 13 by a predetermined distance. The first master piston 14 is biased in the rearward direction by a biasing member 143 including, for example, a spring and the like.

"A servo chamber 1A" is defined by a rear end surface of the flange 141a formed at the first main body portion 141, the front end surface of the inner wall portion 111, an inner circumferential surface of the main cylinder 11 and an outer circumferential surface of the projection portion 142. "A separation chamber 1B" is defined by a rear end surface of the inner wall portion 111, an outer surface of the input piston 131, an inner circumferential surface of the front portion 121a of the cylinder portion 121 and an outer surface of the projection portion 142. "A reaction force chamber 1C" is defined by a rear end surface of the small diameter portion 112 (including a sealing member 91), an outer circumferential surface of the first master piston 14 and the inner circumferential surface of the main cylinder 11.

The second master piston 15 is coaxially arranged within the main cylinder 11 at a location forward of the first master piston 14. The second master piston 15 is formed in a substantially bottomed cylinder shape having an opening at a front portion thereof and a bottom wall 151 at a rear portion thereof. More specifically, the second master piston 15 includes the bottom wall 151 and a circumferential wall portion 152 having the same diameter with the bottom wall 151. The bottom wall 151 is arranged between the small diameter portions 112, 113 at a location forward of the first master piston 14. The rear portion of the second master piston 15 including the bottom wall 151 is spaced apart from the inner circumferential surface of the main cylinder 11. The circumferential wall portion 152 is formed in a cylindrical shape and coaxially and extends forward from an outer edge of the bottom wall 151. The circumferential wall portion 152 is liquid-tightly provided slidably movable in the axial direction relative to the small diameter portion 113 and in liquid-tightly therewith, while allowing the circumferential wall portion 152 to be slidably movable within the small diameter portion 113 in the axial direction. The second master piston 15 is biased in the rearward direction by a biasing member 153 formed, for example, by a spring or the like.

A first hydraulic pressure chamber 1D is defined by an outer surface of the second master piston 15, a front end surface of the first master piston 14, an inner surface of the first master piston 14, a front end surface of the small diameter portion 112 (including a sealing member 92), a rear end surface of the small diameter portion 113 (including a sealing member 93) and the inner circumferential surface of the main cylinder 11 between the small diameter portions 112, 113. Furthermore, a second hydraulic pressure chamber 1E is defined by a bottom surface 111d inside the main cylinder 11, a front end surface of the second master piston 15, an inner surface of the second master piston 15, a front end surface of the small diameter portion 113 (including a sealing member 94) and the inner circumferential surface of the main cylinder 11. It is noted that the first and the second hydraulic pressure chambers 1D and 1E are also referred to as "master chamber".

Ports 11a to 11i, which connect the inside and the outside, are formed at the master cylinder 1. The port 11a is formed at the main cylinder 11 at a location rearward of the inner wall portion 111. The port 11b is formed at the main cylinder 11 opposite to the port 11a at approximately the same location in the axial direction. The port 11a and the port 11b are in communication through a clearance formed between the inner circumferential surface of the main cylinder 11 and the outer circumferential surface of the cylinder portion 121. The port 11a is connected to a conduit 161. The port 11b is connected to a reservoir 171. In other words, the port 11a is in communication with the reservoir 171.

The port 11b is in communication with the separation chamber 1B via a passage 18 formed at the cylinder portion 121 and the input piston 13. The passage 18 is divided when the input piston 13 moves forward. In other words, when the input piston 13 moves forward, the separation chamber 1B and the reservoir 171 are disconnected from each other.

The port 11c is formed at a location forward of the port 11a and connects the separation chamber 1B with a conduit 162. The port 11d is formed at a location forward of the port 11c and connects the servo chamber 1A with a conduit 163. The port 11e is formed at a location forward of the port 11d and connects the reaction force chamber 1C with a conduit 164.

The port 11f is formed between the sealing members 91, 92 of the small diameter portion 112 and connects a reservoir 172 with the inside of the main cylinder 11. The port 11*f* is in communication with the first hydraulic pressure chamber 1D via a passage 144 formed at the first master piston 14. The passage 144 is formed at a location slightly rearward of the sealing member 92 so that the port 11*f* and the first hydraulic pressure chamber 1D are disconnected from each other when the first master piston 14 moves forward.

The port 11*g* is formed at a location forward of the port 11*f* and connects the first hydraulic pressure chamber 1D with a conduit 51. The port 11*h* is formed between the sealing members 93 and 94 of the small diameter portion 113 and connects a reservoir 173 with the inside of the main cylinder 11. The port 11*g* is in communication with the second hydraulic pressure chamber 1E via a passage 154 formed at the second master piston 15. The passage 154 is formed at a location slightly rearward of the sealing member 94 so that the port 11*g* and the second hydraulic pressure chamber 1E are disconnected from each other when the second master piston 15 moves forward. The port 11*i* is formed at a location forward of the port 11*h* and connects the second hydraulic pressure chamber 1E with a conduit 52. The brake pedal 10 is provided with a stroke sensor 72. The stroke sensor 72 is a sensor which detects the stroke amount "str" (operation amount of the operation of the vehicle) of the brake pedal 10 and the detected result is sent to the brake ECU 6.

A sealing member such as an O-ring and the like (see black dots in FIG. 1) are appropriately provided within the master cylinder 1. The sealing members 91 and 92 are provided at the small diameter portion 112 and are liquid-tightly in contact with the outer circumferential surface of the first master piston 14. Similarly, the sealing members 93 and 94 are provided at the small diameter portion 113 and are liquid-tightly in contact with the outer circumferential surface of the second master piston 15. Additional sealing members are provided between the input piston 13 and the cylinder portion 121.

(Reaction Force Generating Device 2)

The reaction force generating device 2 includes a stroke simulator 21. The stroke simulator 21 generates a reaction force pressure Pr in the reaction force chamber 1C in response to the pedal stroke amount "str" of the brake pedal 10 depressed by the driver of the vehicle through the separation chamber 1B. Generally, the stroke simulator 21 is configured in such a manner that a piston 212 is fitted into a cylinder 211 while being allowed to slidably move therewith and a simulator fluid chamber 214 is formed at a location forward of the piston 212, which is biased in the forward direction by a compression spring 213. The stroke simulator 21 is connected to the reaction force chamber 1C via the conduit 164 and the port 11*e*, and is connected to the separation lock valve 22 and the reaction force valve 3 via the conduit 164.

(The Separation Lock Valve 22)

The separation lock valve 22 is a normally-closed-type electromagnetic valve and is configured so that opening and closing thereof are controlled by the brake ECU 6. The separation lock valve 22 is connected to the conduit 164 and the conduit 162, and is configured to connect/disconnect the conduit 162 with/from the conduit 164. The separation lock valve 22 is an open/close valve for connecting/disconnecting the separation chamber 1B with/from the reaction force chamber 1C.

(The Reaction Force Valve 3)

The reaction force valve 3 is a normally-open-type electromagnetic valve and is configured so that opening and closing thereof is controlled by the brake ECU 6. The reaction force valve 3 is connected to the conduit 164 and the conduit 161, and is configured to connect/disconnect the conduit 161 with/from the conduit 164. The reaction force valve 3 is a valve which connects/disconnects the separation chamber 1B and the reaction force chamber 1C with/from the reservoir 171 when the separation lock valve 22 is in an open state. The reaction force valve 3 connects/disconnects the reaction force chamber 1C with/from the reservoir 171 when the separation lock valve 22 is in a closed state.

(Control of the Separation Lock Valve 22 and the Reaction Force Valve)

The control of the reaction valve 3 and the separation lock valve 22 by the brake ECU 6 under a braking operation will be explained hereinafter. When the brake pedal 10 is depressed, the input piston 13 advances to interrupt the fluid flow through the passage 18 to thereby interrupt the fluid communication between the reservoir 171 and the separation chamber 1B. At the same time, the brake ECU 6 controls the reaction force valve 3 to be in a closed state from an open state and controls the separation lock valve 22 to be in an open state from a closed state. The fluid communication between the reaction force chamber 1C and the reservoir 171 is interrupted by the closing of the reaction force valve 3 and the fluid communication between the separation chamber 1B and the reaction chamber 1C is established by the opening of the separation lock valve 22. In other words, when the input piston advances and the reaction force valve 3 is closed, the separation chamber 1B and the reaction chamber 1C are disconnected from the fluid communication with the reservoir 171. Then the stroke simulator 21 generates the reaction force pressure Pr which corresponds to the stroke amount "str" of the brake pedal depressed by the driver in the separation chamber 1B and the reaction force chamber 1C. Under such situation, the braking fluid flowing into or out of the reaction force chamber 1C is the same amount with the braking fluid flowing into or out of the separation chamber 1B in response to the movements of the first master piston 14 and the second master piston 15.

(The Servo Pressure Generating Device 4)

The servo pressure generating device 4 mainly includes a pressure decreasing valve 41, a pressure increasing valve 42, a pressure supplying portion 43 and a regulator 44. The pressure decreasing valve 41 is a normally-open-type electromagnetic valve (linear electromagnetic valve) and flow-rate therethrough is controlled by the brake ECU 6. One outlet/inlet of the pressure decreasing valve 41 is connected to the conduit 161 via a conduit 411, and the other outlet/inlet of the pressure decreasing valve 41 is connected to a conduit 413. More specifically, the one outlet/inlet of the pressure decreasing valve 41 is in communication with the reservoir 171 via the conduits 411, 161, and ports 11*a*, 11*b*. The pressure increasing valve 42 is a normally-closed-type electromagnetic valve (a linear electromagnetic valve) and is configured so that an opening area thereof is linearly controlled by the brake ECU 6, thereby controlling the hydraulic pressure at the downstream passage of the pressure increasing valve 42. One outlet/inlet of the pressure increasing valve 42 is connected to a conduit 421, and the other outlet/inlet of the pressure increasing valve 42 is connected to a conduit 422.

The pressure supplying portion 43 supplies the braking fluid under high pressure to the regulator 42 on the basis of a command from the brake ECU 6. The pressure supplying portion 43 mainly includes an accumulator 431, a pump 432, a motor 433 and a reservoir 434.

The accumulator 431 pressure accumulates the hydraulic pressure generated by the pump 432. The accumulator 431 is connected to the regulator 44, a hydraulic pressure sensor 74 and the pump 432 via a conduit 431*a*. The pump 432 is connected to the motor 433 and the reservoir 434. The pump 432 supplies the braking fluid accumulated in the reservoir 434 to the accumulator 431 when the motor 433 is driven. The braking fluid reserved in the reservoir 434 is supplied to the accumulator 431. The hydraulic pressure sensor 74 detects the hydraulic pressure of the braking fluid accumulated in the accumulator 431. The hydraulic pressure detected by the hydraulic pressure sensor 74 is defined to be an accumulator pressure Pac.

When the hydraulic pressure sensor 74 detects that the accumulator pressure Pac decreases to a value equal to or lower than a predetermined value, the motor 433 is driven on the basis of a control signal from the brake ECU 6, and the pump 432 supplies the braking fluid to the accumulator 431 in order to supply a pressure energy to the accumulator 431.

Figure 2:
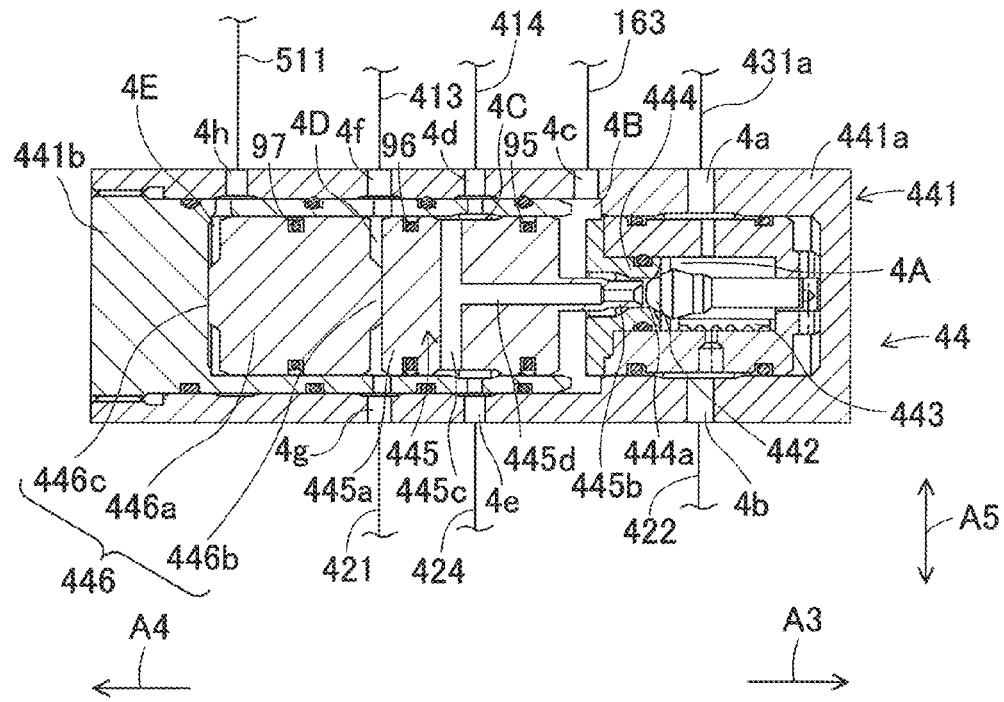
FIG. 2 is a cross sectional partial view illustrating a configuration of a regulator 44 according to the embodiment in FIG. 1.

As shown in FIG. 2, the regulator 44 is configured in such a manner that mainly a sub-piston 446 is added to a standard or normal regulator. FIG. 2 is a partial cross sectional view of an example of the structure of the regulator 44 shown in FIG. 1. As shown in the drawing, FIG. 2, the regulator 44 mainly includes a cylinder 441, a ball valve 442, a biasing portion 443, a valve seat portion 444, a control piston 445 and the sub-piston 446.

The cylinder 441 includes a cylinder case 441a formed in a substantially bottomed cylinder-shape having a bottom surface at one end thereof (in the arrow A3 direction side), and a cover member 441b closing an opening (in the arrow A4 direction side) of the cylinder case 441a. The cover member 441b is formed to be substantially U-shaped in cross-section in FIG. 2. However, the regulator 44 is explained herewith the cover member 441b as a columnar-shaped member, and a portion that closes the opening of the cylinder case 441a as the cover member 441b in this embodiment. The cylinder case 441a is provided with plural ports 4a to 4h through which the inside and the outside of the cylinder case 441a are in communication.

The port 4a is connected to the conduit 431a. The port 4e is connected to the conduit 424. The port 4c is connected to the conduit 163. The port 4d is connected to the conduit 161 via the conduit 414. The port 4b is connected to a conduit 424, which is connected to the conduit 424 via a relief valve 423. The port 4f is connected to the conduit 413. The port 4g is connected to the conduit 421. The port 4h is connected to a conduit 511, which is diverged from the conduit 51.

The ball valve 442 is a valve having a ball shape at an end portion thereof. The ball valve 442 is provided within the cylinder 441 at a location closer to the bottom surface (in the arrow A3 direction side and the bottom surface side will be hereinafter referred to as a cylinder bottom surface side) of the cylinder case 441a. The biasing portion 443 is a spring member biasing the ball valve 442 towards the opening (in the arrow A4 direction side and the opening will be hereinafter referred to as a cylinder opening side) of the cylinder case 441a, and is provided at the bottom surface of the cylinder case 441a. The valve seat portion 444 includes a wall member provided at the inner peripheral surface of the cylinder case 441a and divides the inside of the cylinder case into the cylinder opening side (in the arrow A4 direction side) and the cylinder bottom surface side (in the arrow A3 direction side) and a through passage 444a is formed at the central portion of the valve seat portion 444 for fluid communication between the cylinder opening side (in the arrow A4 direction side) and the cylinder bottom surface side (in the arrow A3 direction side). The valve seat portion 444 supports the ball valve 442 from the cylinder opening side (in the arrow A4 direction side) by closing the through passage 444a by the biased ball valve 442.

A space defined by the ball valve 442, the biasing portion 443, the valve seat portion 444, and a portion of the inner circumferential surface of the cylinder case 441a positioned closer to the cylinder bottom surface (in the arrow A3 direction side) is referred to as a first chamber 4A. The first chamber 4A is filled with the braking fluid. The first chamber 4A is connected to the conduit 431a via the port 4a and to the conduit 422 via the port 4b.

The control piston 445 includes a main body portion 445a formed in a substantially columnar shape and a projection portion 445b formed in a substantially columnar shape having a smaller diameter than the main body portion 445a. The main body portion 445a is provided inside the cylinder 441 in a coaxial and liquid-tight manner relative to the cylinder opening side (in the arrow A4 direction side) of the valve seat portion 444, while allowing the main body portion 445a to be slidably movable in the axial direction. The main body portion 445a is biased towards the cylinder opening side (in the arrow A4 direction side) by means of a biasing member, which is not illustrated in FIG. 2. A passage 445c is formed at a substantially intermediate portion of the main body portion 445a in the cylinder axial direction. The passage 445c extends in a peripheral direction (in the arrow A5 direction) so that both end portions thereof open at a circumferential surface of the main body portion 445a. A portion of the inner circumferential surface of the cylinder 441 corresponding to the location of the opening of the passage 445c is provided with the port 4d and is formed to be recessed so as to form a third chamber 4C together with the main body portion 445a.

The projection portion 445b projects towards the cylinder bottom surface side (in the arrow A3 direction side) from a center portion of an end surface of the main body portion 445a facing the cylinder bottom surface (in the arrow A3 direction side). The projection portion 445b is formed so that the diameter thereof is smaller than the diameter of the through passage 444a of the valve seat portion 444. The projection portion 445b is coaxially provided relative to the through passage 444a. An end portion of the projection portion 445b is spaced apart from the ball valve 442 towards the cylinder opening side (in the arrow A4 direction side) by a predetermined distance. A passage 445d is formed at the projection portion 445b so that the passage 445d extends in the cylinder axial direction and opens at a center portion of an end surface of the projection portion 445b facing the cylinder bottom surface (in the arrow A3 direction side). The passage 445d extends to the inside of the main body portion 445a and is connected to the passage 445c.

A space defined by the end surface of the main body portion 445a facing the cylinder bottom surface (in the arrow A3 direction side), an outer surface of the projection portion 445b, the inner circumferential surface of the cylinder 441, the valve seat portion 444, and the ball valve 442 is referred to as a "second chamber 4B". The second chamber 4B is in communication with the ports 4d, 4e via the passages 445c, 445d, and the third chamber 4C.

The sub-piston 446 includes a sub main body portion 446a, a first projection portion 446b, and a second projection portion 446c. The sub main body portion 446a is formed in a substantially columnar shape. The sub main body portion 446a is provided within the cylinder 441 in the coaxial and liquid-tight manner relative to the cylinder opening side (in the arrow A4 direction side) of the main body portion 445a while allowing the sub main body portion 446a to be slidably movable in the axial direction.

The first projection portion 446b is formed in a substantially columnar shape having a smaller diameter than the sub main body portion 446a and projects from a center portion of an end surface of the sub main body portion 446a facing the cylinder bottom surface (in the arrow A3 direction side). The first projection portion 446b contacts an end surface of the main body portion 445a facing the cylinder opening (in the arrow A3 direction side). The second projection portion 446c is formed in the same shape as the first projection portion 446b. The second projection portion 446c projects from a center portion of an end surface of the sub main body portion 446a facing the cylinder opening (in the arrow A3 direction side). The second projection portion 446c contacts the cover member 441b.

A space defined by the end surface of the sub main body portion 446a facing the cylinder bottom surface (in the arrow A3 direction side), an outer surface of the first projection portion 446b, an end surface of the control piston 445 facing the cylinder opening, (in the arrow A4 direction side) and the inner circumferential surface of the cylinder 441 is referred to as a pilot pressure chamber 4D. The pilot pressure chamber 4D is in communication with the pressure decreasing valve 41 via the port 4f and the conduit 413, and with the pressure increasing valve 42 via the port 4g and the conduit 421.

A space defined by the end surface of the sub main body portion 446a facing the cylinder opening (in the arrow A4 direction side), an outer surface of the second projection portion 446c, the cover member 441b, and the inner circumferential surface of the cylinder 441 is referred to as a fourth chamber 4E. The fourth chamber 4E is in communication with the port 11g via the port 4h and the conduits 511, 51. Each of the chambers 4A through 4E is filled with the braking fluid. A hydraulic pressure sensor 73 detects the pressure (the servo pressure Ps) in the servo chamber 1A, and is connected to the conduit 163.

A sealing member such as an O-ring and the like (see black dots in FIG. 1) are appropriately provided within the regulator 44. Particularly, the sealing members 95 and 96 are provided at the control piston 445 and are liquid-tightly in contact with the inner circumferential surface of the cylinder case 441a. Similarly, a sealing member 97 is provided at the sub piston 446 and is liquid-tightly in contact with the inner circumferential surface of the cylinder case 441a.

(ABS Actuator 53 and Wheel Cylinders 541 to 544)

The first hydraulic pressure chamber 1D and the second hydraulic pressure chamber 1E, in which a master pressure Pm is generated, are in communication with the wheel cylinders 541 through 544 via the conduits 51, 52, and the ABS actuator 53. The wheel cylinders 541 to 544 form a braking device 5 at each vehicle wheel 5FR to 5RL. More specifically, the known ABS (Antilock Brake System) actuator 53 is connected to the port 11g of the first hydraulic pressure chamber 1D and the port 11i of the second hydraulic pressure chamber 1E via the conduits 51, 52, respectively. The ABS actuator 53 is connected to the wheel cylinders 541 through 544, which activate the braking operation in the vehicle wheels 5FR through 5RL.

The ABS actuator 53 is explained with a configuration of one of the four wheels (5FR) as an example, and explanation about other wheels will be omitted because all four wheels are configured the same. The ABS actuator 53 includes a holding valve 531, a pressure decreasing valve 532, a reservoir 533, a pump 534, and a motor 535. The holding valve 531 (corresponding to the electro-magnetic valve) is a normally-open-type electromagnetic valve and is configured so that opening and closing thereof is controlled by the brake ECU 6. The holding valve 531 is arranged so that one side is connected to the conduit 52 and the other side is connected to the wheel cylinder 541 and the pressure decreasing valve 532. In other words, the holding valve 531 serves as an input valve for ABS actuator 53.

The pressure decreasing valve 532 is a normally closed type electromagnetic valve and opening and closing operation thereof is controlled by the brake ECU 6. The pressure decreasing valve 532 is connected to the wheel cylinder 541 and the holding valve 531 at one side thereof and is connected to the reservoir 533 at the other side. When the pressure decreasing valve 532 is open, the communication between the wheel cylinder 541 and the reservoir 533 is established.

The reservoir 533 stores the braking fluid and is connected to the conduit 52 via the pressure decreasing valve 532 and the pump 534. The pump 534 is connected to the reservoir 533 at the suction port and the discharge port is connected to the conduit 52 via the one-way valve "z". It is noted here that the one-way valve "z" allows the flow from the pump 534 to the conduit 52 (the second hydraulic pressure chamber 1E) but restricts the flow in opposite direction. The pump 534 is driven by the motor 535 which is actuated by a command from the brake ECU 6. The pump 534 (534) suctions the braking fluid stored in the reservoir 533 or in the wheel cylinder 541 and returns the fluid into the second hydraulic pressure chamber 1E under the pressure decreasing mode of the ABS control. It is noted that a damper (not shown) is provided in the upper stream side of the pump 534 to dampen the pulsation of the braking fluid discharged by the pump 534.

The brake control device for a vehicle according to the embodiment includes a wheel speed sensor (not illustrated) that detects the corresponding vehicle wheel speed. The wheel speed sensor is configured so that a detection signal indicative of the wheel speed detected by the wheel speed sensor is outputted to the brake ECU 6. The brake ECU 6 instructs the ABS actuator 53 to execute the ABS control (Anti-lock Brake Control) wherein each electromagnetic valve 531 and 532 is opened or closed based on the vehicle wheel speed state and longitudinal acceleration to adjust the hydraulic braking pressure to be applied to the wheel cylinder 541 or the braking force to be applied to the vehicle wheel 5FR by operating the motor when necessary. Based on the instructions from the brake ECU 6, the ABS actuator 53 supplies the hydraulic braking pressure with the wheel cylinders 541 to 544 by adjusting the amount of the braking fluid supplied from the master cylinder 1 or the timing of supply thereof.

In a "linear mode", which will be later explained in detail, the accumulator pressure Pac transmitted from the accumulator 431 of the servo pressure generating device 4 is controlled by the pressure increasing valve 42 and the pressure decreasing valve 41, and the servo pressure Ps is generated at the servo chamber 1A and the first master piston 14 and the second master piston 15 move forward and the first hydraulic pressure chamber 1D and the second hydraulic pressure chamber 1E are pressurized. The hydraulic pressure (master pressure Pm) at the first hydraulic pressure chamber 1D and the second hydraulic pressure chamber 1E is applied to the wheel cylinders 541 through 544 as the master pressure Pm from the ports 11g, 11i via the conduits 51, 52 and the ABS 53, and a hydraulic pressure braking force is applied to the wheels 5FR through 5RL. It is noted that check valves "z" are appropriately provided at the pressure decreasing valve 41, the reaction force valve 3, a pressure modulating portion 43 and the ABS actuator 53.

(The Brake ECU 6)

The brake ECU 6 is an electronic control unit and communicates with various sensors 71 through 74. The brake ECU 6 controls the electro-magnetic valves 22, 3, 41, 42, 531 and 532 and motors 433 and 535. The brake ECU 6 memorizes two control modes, the "linear mode" and a "REG (regulator) mode". The "linear mode" is a normal brake control. More specifically, the linear mode is a mode to control the "servo pressure" of the servo chamber 1A in such a manner that the pressure decreasing valve 41 and the pressure increasing valve 42 are controlled while the separation lock valve 22 is opened and the reaction force valve 3 is closed.

The "REG mode" is a mode to turn the pressure decreasing valve 41, the pressure increasing valve 42, the separation lock valve 22 and the reaction force valve 3 to be in a non-energized state, or a mode to be executed in a case that the pressure decreasing valve 41, the pressure increasing valve 42, the separation lock valve 22 and the reaction force valve 3 are turned to be in the non-energized state (maintaining a normal state) because of a failure and the like.

(Linear Mode)

Under the brake pedal 10 being not operated, the brake control device is in the state explained above, i.e., the ball valve 442 is closing the through-passage 444a of the valve seat portion 444 and the first chamber 4A and the second chamber 4B are hydraulically separated from each other. Further, the pressure decreasing valve 41 is in an open state whereas the pressure increasing calve 42 is in a closed state.

The second chamber 4B is in fluid communication with the servo chamber 1A through the conduit 163 and both chambers 4B and 1A are kept to be the same hydraulic pressure in each chamber. The second chamber 4B is in fluid communication with the third chamber 4C through passages 445c and 445d of the control piston 445 and accordingly, the second chamber 4B and the third chamber 4C are hydraulically connected to the reservoir 171 through the conduits 414 and 161. One port of the pilot pressure chamber 4D is closed by the pressure increasing calve 42 and the other port is open to the reservoir 171 through the open state pressure decreasing valve 41. The pilot pressure chamber 4D and the second chamber 4B are kept to be the same hydraulic pressure in each chamber. The fourth chamber 4E is in fluid communication with the first hydraulic pressure chamber 1D through conduits 511 and 51 and the two chambers have the same hydraulic pressure therein.

When the brake pedal 10 is depressed from the state above by the driver of the vehicle, first a regeneration braking operation is performed. The brake ECU 6 divides the requested braking force which depends on the braking operation amount of the driver into the hydraulic pressure braking force generated by the hydraulic pressure of the braking fluid and the regeneration braking force. The ratio of the hydraulic pressure braking force and the regeneration braking force relative to the total braking operation amount is defined in advance by a map, a table or a relational expression. The hybrid ECU actuates the motor as a generator to apply regeneration braking force to the drive wheels. Thus, the vehicle is decelerated and motion (rotation) energy is converted into the electric energy. Thus converted electric energy is recovered by battery through an inverter. After a predetermined regeneration braking operation, the brake ECU 6 controls the pressure decreasing valve 41, pressure increasing valve 42 and the motor 433 based on the information from the stroke sensor 72. In other words, the pressure decreasing valve 41 is controlled to be closed and the pressure increasing calve 42 is controlled to be open. Further, the brake ECU 6 controls the accumulator pressure Pac of the accumulator 431 by driving the motor 433.

The accumulator 431 and the pilot pressure chamber 4D establish fluid communication by opening of the pressure increasing valve 42 and the communication between the pilot pressure chamber 4D and the reservoir 171 is interrupted by closing of the pressure decreasing valve 41. The pressure (pilot pressure Pi) in the pilot pressure chamber 4D can be raised by the high pressure braking fluid introduced into the pilot pressure chamber 4D supplied from the accumulator 431. By supplying the pilot pressure chamber 4D with a high pressure to increase the pilot pressure Pi, the control piston 445 is slidably moves within the cylinder towards the cylinder bottom surface side (in the arrow A3 direction side) and the tip end of the projection portion 445b of the control piston 445 is brought into contact with the ball valve 442 to close the passage 445d. Thus, the fluid communication between the second chamber 4B and the reservoir 171 is interrupted.

Further movement of the control piston 445 towards the cylinder bottom surface side (in the arrow A3 direction side), the ball valve 442 is pushed by the projection portion 445b towards the cylinder bottom surface side (in the arrow A3 direction side) and is separated from the valve seat portion 444. Thus, the first chamber 4A and the second chamber 4B establish fluid communication through the through passage 444a of the valve seat portion 444. Since the first chamber 4A is connected to the accumulator 431 to be supplied with a high pressure braking fluid therefrom, the pressure in the second chamber 4B is also increased due to the establishment of fluid communication between the chambers 4A and 4B.

Corresponding to the pressure increasing in the second chamber 4B, the pressure (servo pressure Ps) in the servo chamber 1A which is in fluid communication with the second chamber 4B is also increased. By the increase of the servo pressure Ps, the first master piston 14 advances and the pressure (master pressure Pm) of the first hydraulic pressure chamber 1D is increased. Then the second master piston 15 advances and the pressure (master pressure Pm) of the second hydraulic pressure chamber 1E is also increased. By this increase of the pressure (master pressure Pm) of the first hydraulic pressure chamber 1D, the high pressure braking fluid is supplied to the ABS actuator 53 and the fourth chamber 4E. The pressure in the fourth chamber 4E increases and accordingly, the pressure (pilot pressure Pi) in the pilot pressure chamber 4D increases. Therefore, the sub piston 446 does not move due to pressure balance. Thus, the braking operation is performed on the vehicle by supplying the wheel cylinders 541 through 544 with a high pressure (master pressure Pm) through the ABS actuator 53. Under the linear mode, the force which moves the first master piston 14 corresponds to the force corresponding to the servo pressure Ps.

When the braking operation is released, the pressure decreasing valve 41 is opened and the pressure increasing valve 42 is closed thereby to establish communication between the reservoir 171 and the pilot pressure chamber 4D. Thus, the control piston 445 is retreated and the brake control device returns to the state before the driver of the vehicle operates the brake pedal 10.

(REG Mode)

In the REG mode, the pressure decreasing valve 41, pressure increasing valve 42, separation lock valve 22 and the reaction force valve 3 are not energized (not controlled) and accordingly, the pressure decreasing valve 41 is in an open state, the pressure increasing valve 42 is in a closed state, the separation lock valve 22 is in a closed state and the reaction force valve 3 is in an open state. This non-energized state (non-controlled state) continues after the driver of the vehicle has operated (depressed) the brake pedal 10.

In the REG mode, when the driver of the vehicle operates the brake pedal 10, the input piston 13 advances to interrupt the communication between the separation chamber 1B and the reservoir 171 by disconnecting the passage 18. Under this state, since the separation lock valve 22 is in the closed state, the separation chamber 1B becomes sealed state. However, since the reaction force chamber 1C is in fluid communication with the reservoir 171 due to the open state of the reaction force valve 3.

From this state, the driver of the vehicle further depressed the brake pedal 10, the input piston 13 further advances to increase the pressure (separation pressure Pb) in the separation chamber 1B. The first master piston 14 is then moves forward by this increased separation pressure Pb. Since the pressure decreasing valve 41 and the pressure increasing valve 42 are not energized under this situation, servo pressure Ps is not controlled. In other words, the first master piston (piston) 14 is moved forward only by the force (separation pressure Pb) corresponding to the driver's operation on the brake pedal. The volume of the servo chamber 1A becomes large but since the chamber 1A is in fluid communication with the reservoir 171 through the regulator 44, the braking fluid is supplied therefrom.

When the first master piston 14 advances, as similar to the case in the linear mode, the pressures (master pressure Pm) of the first and the second hydraulic pressure chambers 1D and 1E increase. By the pressure increasing in the first hydraulic pressure chamber 1D, the pressure in the fourth chamber 4E increases. By the pressure increasing in the fourth chamber 4E, the sub piston 446 slidably moves towards the cylinder bottom surface side (in the arrow A3 direction). At the same time the control piston 445 slidably moves towards the cylinder bottom surface side (in the arrow A3 direction) by being pushed by the first projection portion 446b. Thus, the projection portion 445b is brought into contact with the ball valve 442 and the ball valve 442 moves towards the cylinder bottom surface side (in the arrow A3 direction) thereby. In other words, the first and the second chambers 4A and 4B establish fluid communication therebetween and the servo chamber 1A and the reservoir 171 interrupt fluid communication therebetween. The high pressure braking fluid from the accumulator 431 is supplied to the servo chamber 1A.

As explained above, according to the REG mode, when the input piston 13 moves by a predetermined stroke by depression of the brake pedal 10 by the driver of the vehicle, the accumulator 431 and the servo chamber 1A establish fluid communication and the servo pressure Ps is increased without assistance of control. Then the first master piston 14 is moved forward more than the operation force by the driver's depression of the brake pedal 10. Accordingly, even the electromagnetic valves are not energized, high pressure braking fluid is supplied to the wheel cylinders 541 through 544 via the ABS actuator 53. In the REG mode, the control map is prepared so that a sufficient braking force can be generated to keep a safety vehicle stopping state on a sloping road, considering the safety of stopping at the up/down hill.

In the REG mode, the force for advancing the first master piston 14 corresponds to an operation force of the brake pedal by a driver of the vehicle. The force corresponding to the operation force by the driver includes a force for advancing the first master piston 14 only by the operation force by the driver of the vehicle and a force advancing the first master piston 14 by the servo pressure Ps generated mechanically based on the driving of the master piston.

(Hydraulic Pressure Braking Control)

Figure 3:
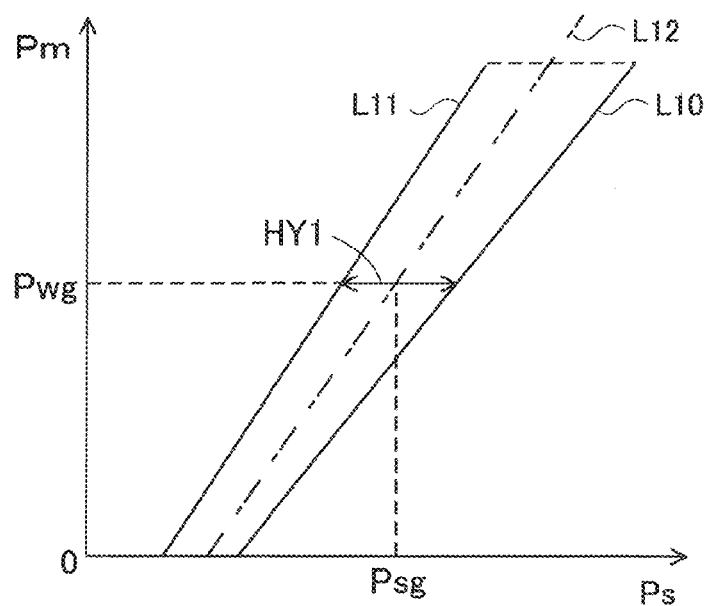
FIG. 3 is an explanatory view showing an example of relationship between the servo pressure Ps and a master pressure Pm.

FIG. 3 shows an example of the relationship between the servo pressure Ps and the master pressure Pm. The horizontal axis indicates the servo pressure Ps and the vertical axis indicates the master pressure Pm. The straight line L10 indicates the pressure increasing characteristic performance line. The straight line L11 indicates the pressure decreasing characteristic performance line and the dotted straight line L12 indicates the relationship between the servo pressure Ps and the master pressure Pm under a state that no sliding resistance is generated. It is noted here that the lines L10 through L12 are illustrated with the straight line but the invention is not limited to the straight lines only but any curves lines or a partially curved line may be included.

As shown in FIG. 1, when the first master piston 14 advances to pressurize the first hydraulic pressure chamber 1D, a sliding resistance is generated between the first master piston 14 and the main cylinder 11. Similarly, when the second master piston 15 advances to pressurize the second hydraulic pressure chamber 1E, another sliding resistance is generated between the second master piston 15 and the main cylinder 11. These sliding resistances are generated due to the sliding friction generated between the first master piston 14 and the second master piston 15 and the sealing members 91 through 94. The pressure supplied to the wheel cylinders 541 through 544 by the first and the second hydraulic pressure chambers 1D and 1E is defined as "master pressure Pm" and the target value of the master pressure Pm is defined as "target wheel cylinder pressure Pwg". The pressure increasing characteristic which defines the necessary servo pressure Ps for increasing the target wheel cylinder pressure Pwg is illustrated by the line L10.

Similarly, when the first master piston 14 retreats to depressurize the first hydraulic pressure chamber 1D and when the second master piston 15 retreats to depressurize the second hydraulic pressure chamber 1E, a sliding resistance is generated between the first master piston 14 and the second master piston 15 and the main cylinder 11. These sliding resistances are generated due to the sliding friction generated between the first master piston 14 and the second master piston 15 and the sealing members 91 through 94. The pressure decreasing characteristic which defines the necessary servo pressure Ps for decreasing the target wheel cylinder pressure Pwg is illustrated by the line L11.

Figure 4:
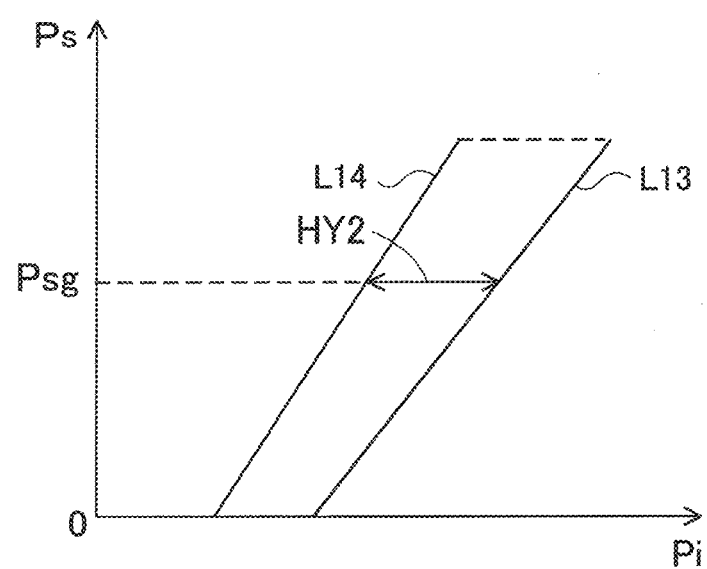
FIG. 4 is an explanatory view showing an example of relationship between a pilot pressure Pi and the servo pressure Ps.

FIG. 4 shows an example of the relationship between the servo pressure Ps and the pilot pressure Pi. The horizontal axis indicates the pilot pressure Pi and the vertical axis indicates the servo pressure Ps. The straight line L13 indicates the pressure increasing characteristic performance line. The straight line L14 indicates the pressure decreasing characteristic performance line. It is noted here that the lines L13 through L14 are illustrated with the straight line but the invention is not limited to the straight lines only but any curves lines or a partially curved line may be included.

As illustrated in FIG. 2, when the control piston 445 is slidably moves towards the cylinder bottom surface side (in the arrow A3 direction side), a sliding resistance is generated between the control piston 445 and the cylinder case 441a. This sliding resistance is mainly caused by the sliding friction between the control piston 445 and the sealing members 95 and 96. When the target wheel cylinder pressure Pw is increased, it is necessary to increase the servo pressure Ps and in order to increase the servo pressure Ps, it is necessary to increase the pilot pressure Pi. The pressure increasing characteristic defining the pilot pressure Pi necessary for increasing the target wheel cylinder pressure Pwg is illustrated by the line L13.

Similarly, when the control piston 445 slidably moves towards the cylinder open surface side (in the arrow A4 direction side), a sliding resistance is generated between the control piston 445 and the cylinder case 441a. This sliding resistance is mainly caused by the sliding friction between the control piston 445 and the sealing members 95 and 96. When the target wheel cylinder pressure Pw is decreased, it is necessary to decrease the servo pressure Ps and in order to decrease the servo pressure Ps, it is necessary to decrease the pilot pressure Pi. The pressure decreasing characteristic defining the pilot pressure Pi necessary for decreasing the target wheel cylinder pressure Pwg is illustrated by the line L14.

As shown in FIG. 3, a hysteresis HY1 is generated in the pressure increasing and decreasing characteristics between the servo pressure Ps and the master pressure Pm. This hysteresis is mainly caused by the sliding friction. Similarly, as shown in FIG. 4, another hysteresis HY2 is generated in the pressure increasing and decreasing characteristics between the servo pressure Ps and the pilot pressure Pi. Accordingly, it is necessary to control generation of master pressure Pm and the servo pressure Ps considering the hysteresis. However, due to a change of pedal stroke amount which is the reference value of calculation, if the target wheel cylinder pressure Pwg, which is the index value of control, varies. Such variations would lead to generation/occurrence of hunting and stepping of the servo pressure Ps during controlling operation.

Figure 5A:
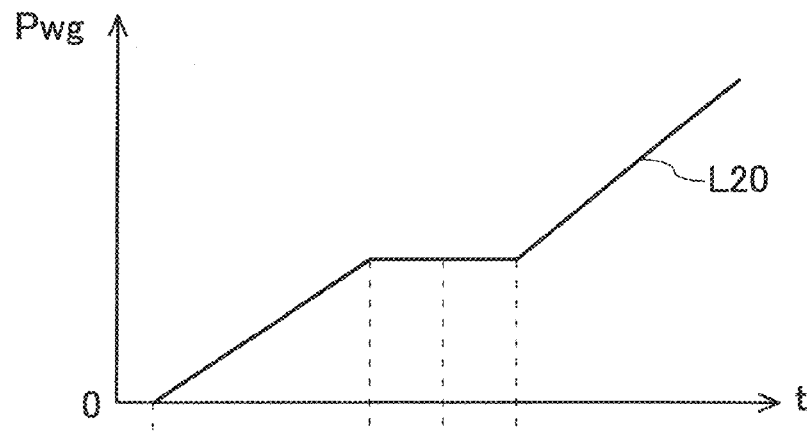
FIG. 5A is an explanatory view showing an example of a change over time of the target wheel cylinder pressure Pwg.
Figure 5B:
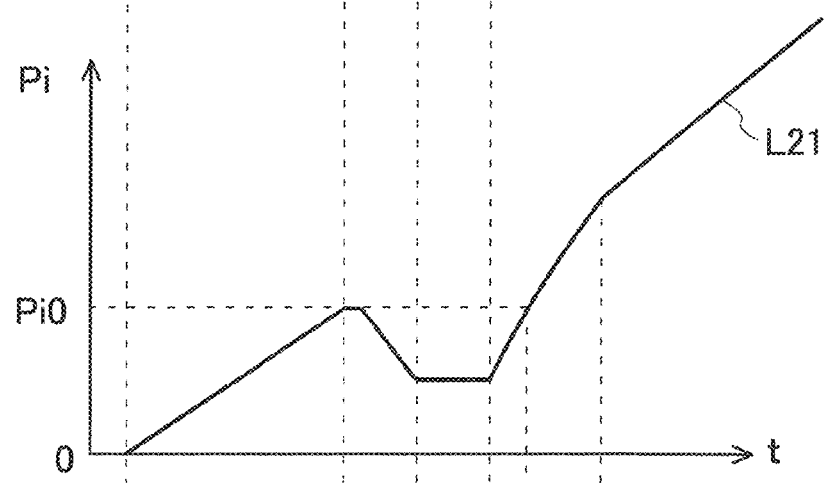
FIG. 5B is an explanatory view showing an example of a change over time of the pilot pressure Pi and FIG. 5C is an explanatory view showing an example of a change over time of the servo pressure Ps.
Figure 5C:
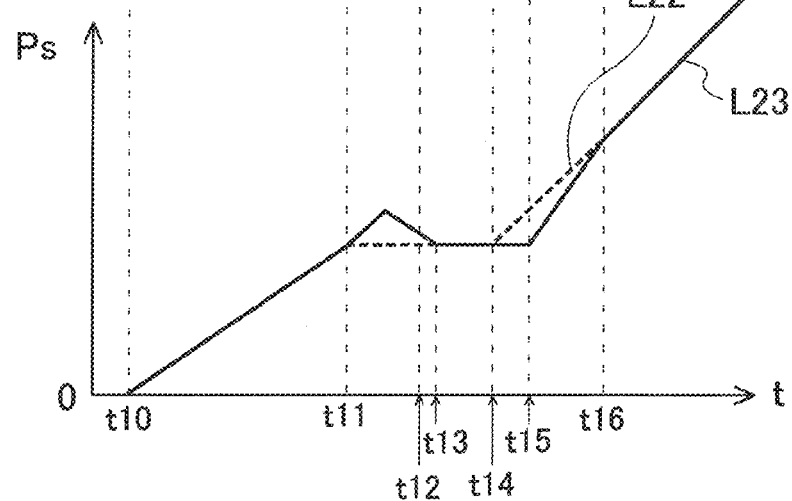

FIG. 5A is an explanatory view of the target wheel cylinder pressure Pwg of a change over time. FIG. 5B is an explanatory view of the pilot pressure Pi of a change over time. FIG. 5C is an explanatory view of the servo pressure Ps of a change over time. The horizontal axis of each Figure indicates the time "t". The curved line L20 indicates the target wheel cylinder pressure Pwg of change over time. The curved line L21 indicates the pilot pressure Pi of change over time. The curved line L22 indicates the ideal servo pressure Ps of change over time, whereas the curved line 23 indicates the actual servo pressure Ps of change over time.

As shown in the curved line L20, the target wheel cylinder pressure Pwg gradually increases from the time t10 to t11 and keeps constant value from the time t11 to the time t14. Then again from the time t14, the target wheel cylinder pressure Pwg gradually increases. The servo pressure Ps gradually increases from the time t10 to the time t11 as shown in the curved line L22 and then keeps a constant value from the time t11 to the time t14. The servo pressure Ps again gradually increases from the time t14. This curved line for the servo pressure Ps is an ideal line. The servo pressure Ps follows the change of the target wheel cylinder pressure Pwg.

However, the actual servo pressure Ps, as indicated by the line L23, gradually increases after the time t11 passed and then decreases gradually until the time t13. Thereafter the servo pressure Ps keeps constant value. At the time t11 when the pilot pressure Pi changed to the holding state, the ball valve 442 is separated from the valve seat portion 444. Accordingly, in order to prevent the servo pressure Ps from increasing, it is necessary for the control piston 445 to move towards the cylinder opening side (in the arrow A4 direction side) as shown in FIG. 2 by overcoming the friction resistance to have the ball valve 442 to be in contact with the valve seat portion 444. Therefore, under this embodiment, even the pressure increasing valve 42 is closed during pressure increasing operation, the ball valve 442 is not immediately brought into contact with the valve seat portion 444. The ball valve 442 and the valve seat portion 444 are kept separated from each other to continue the pressure increasing state until the control valve 445 moves towards the cylinder opening side (in the arrow A4 direction side) by the hydraulic pressure in the third chamber 4C which overcomes the friction resistance of the sealing members 95 and 96. Accordingly, the servo pressure Ps continues to gradually increase after the time t11 for a while.

At this time, as indicated by the curved line L21, it is necessary for the pilot pressure Pi to be decreased by opening the pressure decreasing valve 41 after the pilot pressure Pi becomes the value Pi0. Under this situation, the control piston 445 moves towards the cylinder opening side (in the arrow A4 direction side). Then the servo pressure Ps is gradually decreased after the time t13, the servo pressure Ps becomes constant. The pilot pressure Pi is at this state decreasing compared to the pilot pressure Pi0. Accordingly, the target wheel cylinder Pwg gradually increases from the time t14 again, the servo pressure Ps does not immediately increase. The servo pressure Ps gradually increases from the time t15 where the pilot pressure Pi again increased to the value of Pi0. At the time t16, the curved line L23 agrees with the characteristic of the line 22.

As explained, the pilot pressure Pi is operated in the pressure decreasing direction under the target wheel cylinder pressure Pwg being the holding state that the pressure is in increasing tendency. Accordingly, even the target wheel cylinder pressure Pwg increases again, the servo pressure Ps cannot be immediately increased. The hydraulic pressure braking control according to this embodiment will be explained hereinafter in detail, which can solve this issue.

Figure 6:
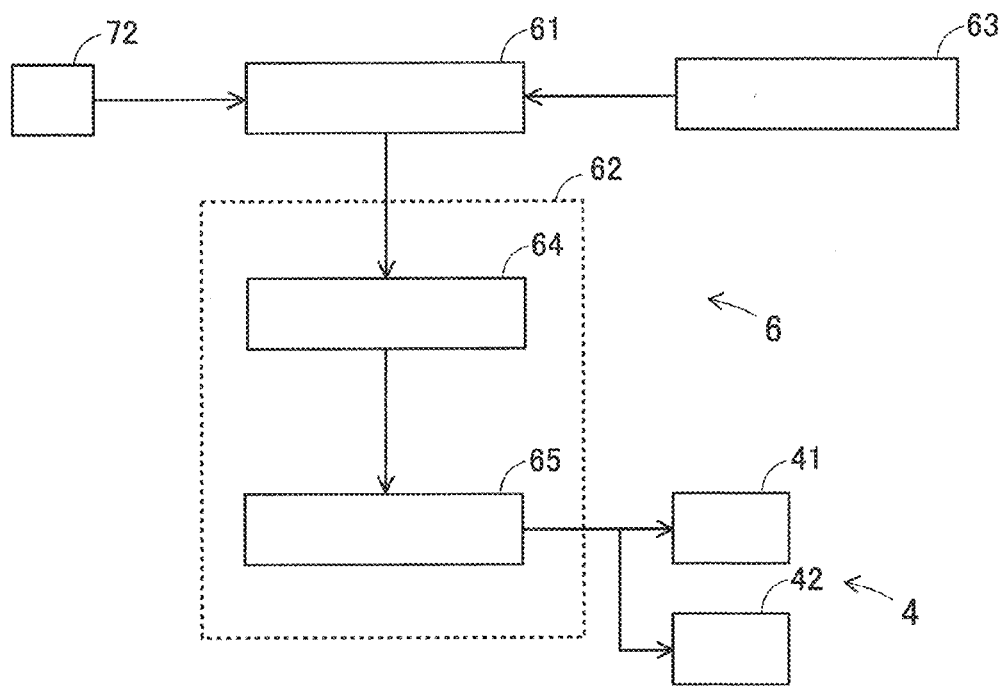
FIG. 6 is a block diagram showing an example of a control block of a hydraulic brake control.

FIG. 6 shows the block diagram of an example of a control block of the hydraulic pressure braking control. The brake ECU 6 is in this embodiment regarded as the hydraulic pressure braking control block 6 in the drawing which includes a target wheel cylinder pressure setting portion 61, a target servo pressure setting portion 62 and a vehicle posture control portion 63. The target servo pressure setting portion 62 includes a pressure increasing and decreasing characteristics selecting portion 64 and an output servo pressure setting portion 65. It is noted that according to this embodiment, the hydraulic pressure control is performed linearly under the linear mode.

(Target Wheel Cylinder Pressure Setting Portion 61)

The target wheel cylinder pressure setting portion 61 sets the target wheel cylinder pressure Pwg which is a target value of the master pressure Pm. The target wheel cylinder pressure Pwg is defined based on the braking operation amount by a depression of brake pedal by the driver of the vehicle. The relationship between the target wheel cylinder pressure Pwg and the braking operation amount is stored in advance in the memory portion of the brake ECU 6 by way of a map, a table, or a relational expression. The braking operation amount can be represented by a pedal stroke amount "str" or pedal depression force.

Figure 7:
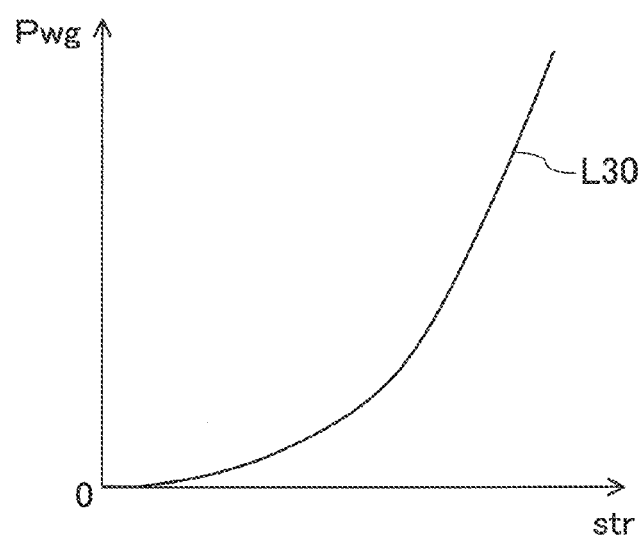
FIG. 7 is an explanatory view showing an example of relationship between the pedal stroke amount "str" and the target wheel cylinder pressure Pwg.

In FIG. 7, an example of the relationship between the pedal stroke amount "str" and the target wheel cylinder pressure Pwg is shown. The horizontal axis represents the pedal stroke amount "str" and the vertical axis represents the target wheel cylinder pressure Pwg. The curved line L30 indicates the relationship between the pedal stroke amount "str" and the target wheel cylinder pressure Pwg. The pedal stroke amount "str" can be obtained by the detection result of the stroke sensor 72. The target wheel cylinder pressure Pwg indicates the hydraulic pressure braking force. As described, the hydraulic pressure braking force is obtained by subtracting the regeneration braking force from necessary braking force of the braking operation amount.

(Target Servo Pressure Setting Portion)

The target servo pressure setting portion 62 sets a target servo pressure Psg necessary for generating the target wheel cylinder pressure Pwg. The target servo pressure setting portion 62 includes the pressure increasing and decreasing characteristics selecting portion 64 and the output servo pressure setting portion 65.

(Pressure Increasing and Decreasing Characteristics Selecting Portion 64)

The pressure increasing and decreasing characteristics selecting portion 64 selects the pressure increasing characteristic which defines the servo pressure Ps necessary for increasing the target wheel cylinder pressure Pwg or the pressure decreasing characteristic which defines the servo pressure Ps necessary for decreasing the target wheel cylinder pressure Pwg. For example, the pressure increasing characteristic is represented by the straight line L10 in FIG. 3, whereas the pressure decreasing characteristic is represented by the straight line L11 in FIG. 3

It is preferable that the pressure increasing and decreasing characteristics selecting portion 64 selects the pressure increasing characteristic when the target wheel cylinder pressure Pwg continuously increases for a predetermined operation judgment period and selects the pressure decreasing characteristic when the target wheel cylinder pressure Pwg continuously decreases for the predetermined operation judging period. The predetermined operation judgment period is the time period by which a judgment can be made whether the value of target wheel cylinder pressure Pwg is in the tendency of continuous pressure increasing state or whether the value of target wheel cylinder pressure Pwg is in the tendency of continuous pressure decreasing state. For example, the pressure increasing and decreasing characteristics selecting portion 64 selects the pressure increasing characteristic when the target wheel cylinder pressure Pwg continuously increases for ten times in one control cycle of the hydraulic pressure braking control and selects the pressure decreasing characteristic when the target wheel cylinder pressure Pwg continuously decreases for ten times in one control cycle of the hydraulic pressure braking control.

According to this operation, the switching over of the characteristics between the pressure increasing and decreasing can be performed when the target wheel cylinder pressure Pwg is in a continuous pressure increasing state or a continuous pressure decreasing state. Thus, an unnecessary switching over between the pressure increasing and decreasing characteristics derived from a periodical changing can be prevented and accordingly, the generation or occurrence of the hunting or stepping phenomenon can be reduced during the controlling of the servo pressure Ps.

It is preferable that the pressure increasing and decreasing characteristics selecting portion 64 selects the pressure increasing characteristic when the target wheel cylinder pressure Pwg is increased from the value zero state. This means that the pressure increasing and decreasing characteristics selecting portion 64 can select the pressure increasing characteristic upon initiation of braking operation. Accordingly, the deficiency of braking force can be prevented by selecting the pressure decreasing characteristic.

(Output Servo Pressure Setting Portion 65)

The output servo pressure setting portion 65 sets the output servo pressure Pso generated by the servo pressure generating device 4. The brake ECU 6 controls the pressure increasing valve 42 and the pressure decreasing valve 41 based on the value of output servo pressure Pso. Based on this output servo pressure Pso, the servo pressure generating device 4 generates the servo pressure Ps.

It is preferable that the output servo pressure setting portion 65 sets the target servo pressure Psg based on the pressure increasing characteristic or the pressure decreasing characteristic selected by the pressure increasing and decreasing characteristics selecting portion 64. In more detail, when the pressure increasing characteristic is selected by the pressure increasing and decreasing characteristics selecting portion 64, the output servo pressure setting portion 65 sets the target servo pressure Psg which is derived from the pressure increasing characteristic. On the other hand, when the pressure decreasing characteristic is selected by the pressure increasing and decreasing characteristics selecting portion 64, the output servo pressure setting portion 65 sets the target servo pressure Psg which is derived from the pressure decreasing characteristic.

For example, when the pressure increasing characteristic is selected by the pressure increasing and decreasing characteristics selecting portion 64, the output servo pressure setting portion 65 sets the target servo pressure Psg using the characteristic indicated by the straight line L10 in FIG. 3 and when the pressure decreasing characteristic is selected by the pressure increasing and decreasing characteristics selecting portion 64, the output servo pressure setting portion 65 sets the target servo pressure Psg which is derived from the pressure decreasing characteristic using the characteristic indicated by the straight line L11 in FIG. 3. The pressure decreasing characteristic and the pressure increasing characteristic are stored in advance in the memory portion of the brake ECU 6 by way of a map, a table, or a relational expression.

It is preferable that the output servo pressure setting portion 65 calculates a filtered target servo pressure Psf and sets the filtered target servo pressure Psf as the output servo pressure Pso. The filtered target servo pressure Psf means the target output servo pressure Psg after filtering treatment. It is preferable for a filtering treatment to use a low pass filter. As a low pass filter, a well-known primary low pass filter (digital filter) can be used as an example. The cut-off frequency wave of the low pass filter can be set to a frequency which can remove any influence of noise generated in the target servo pressure Psg, for example, such frequency can be set to 30 Hz.

It may be possible that even when the same characteristic among the pressure increasing and decreasing characteristics) is continuously selected, the target servo pressure Psg at the pressure decreasing side can be calculated in the pressure increasing tendency state due to a noise or the like. Reversely, the target servo pressure Psg at the pressure increasing side can be calculated in the pressure decreasing tendency state due to a noise or the like. If the target servo pressure Psg at the pressure decreasing side opposite to the tendency of pressure increasing state is calculated, the pilot pressure Pi is decreased in order to decrease the servo pressure Ps. This may generate a stepping at the servo pressure Ps due to the hysteresis of the servo pressure Ps. This is the same to the case where the target servo pressure Psg at the pressure decreasing side opposite to the tendency of pressure increasing state is calculated.

According to this embodiment, the output servo pressure setting portion 65 calculates the filtered target servo pressure Psf which is the target servo pressure Psg to which filtering has been performed using a low pass filter and sets the filtered target servo pressure Psf as the output servo pressure Pso. Therefore, it can prevent the reverse setting of the target servo pressure Psg at the pressure decreasing side derived from the noises or the like reverse to the pressure increasing tendency state as the output servo pressure Pso. It also can prevent the reverse setting of the target servo pressure Psg at the pressure increasing side reverse to the pressure decreasing tendency state as the output servo pressure Pso. Accordingly, any stepping can be prevented which may otherwise be generated during the controlling of servo pressure Ps.

As an example of filtering treatment or process, an averaging of filter can be raised. However, the averaging of filter has a disadvantage that if an extraordinary large noise is momentarily generated, the filter value is changed by such large noise. During the servo pressure Ps being in the pressure increasing tendency state, if such large noise is generated at the decreasing side, the target servo pressure Psg changes to the pressure decreasing side. Similarly, during the servo pressure Ps being in the pressure decreasing tendency state, if such large noise is generated at the increasing side, the target servo pressure Psg changes to the pressure increasing side. According to the embodiment, since the low pass filter is used, the change of target servo pressure Psg can be prevented even when a large noise is momentarily generated at the reverse side.

It is preferable that the output servo pressure setting portion 65 sets the servo pressure (a first output servo pressure Pso1 or a second output servo pressure Pso2) calculated based on the target servo pressure Psg when the deviation between the target servo pressure Psg and the filtered target servo pressure Psf is equal to or more than a predetermined threshold value, as the output servo pressure Pso and sets the filtered target servo pressure Psf as the output servo pressure when the deviation between the target servo pressure Psg and the filtered target servo pressure Psf is less than the predetermined threshold value.

Since the filtered target servo pressure Psf is the pressure of the target servo pressure Psg which has been filtering-processed, if the target servo pressure Psg has to be suddenly changed due to the demand of emergency braking, the response becomes slow to lead to response delay. In this embodiment, the output servo pressure Pso is set based on the servo pressure (first and second output servo pressures Pso1 and Pso2) which is calculated based on the target servo pressure Psg when the deviation in pressure between the target servo pressure Psg which is not filtering processed and the filtered target servo pressure Psf is equal to or more than the predetermined threshold value.

By this structure, for example, when the target servo pressure Psg has to be suddenly changed upon a demand of emergency braking operation, the servo pressure (first and second output servo pressures Pso1 and Pso2) which is calculated based on the target servo pressure Psg is set to be the output servo pressure Pso to avoid response delay of braking operation upon emergency. The values of the first and the second output servo pressures are set considering the hysteresis generated art the servo pressure Ps. For example, the first output servo pressure Pso1 is calculated by subtracting the hysteresis value (first threshold value TH1) from the target servo pressure Psg and the second output servo pressure Pso2 is calculated by adding the hysteresis value (second threshold value TH2) to the target servo pressure Psg.

(Vehicle Posture Control Portion 63)

The vehicle posture control portion 63 controls the vehicle posture by adjusting the vehicle braking force by instructing the target wheel cylinder pressure Pwg to the target wheel cylinder pressure setting portion 61. Some examples of vehicle posture controlling are a well-known ABS controlling, VSC (Vehicle Stability Control) controlling, Traction controlling and Braking assisting controlling.

The ABS control prevents the vehicle from skidding by releasing the vehicle wheel locking by increasing or decreasing the braking force to be applied to the wheels. The VSC control minimizes the skidding of the vehicle by applying braking force to the front wheels when the vehicle is being in over steering tendency and by applying the braking force to the rear wheels when the vehicle is being in under steering tendency. The traction control stabilizes the vehicle posture upon starting or upon acceleration by decreasing the driving force to the wheel which is detected to be in idle rotation and at the same time applying braking force to the idling wheel. The braking assisting control increases the braking force when an emergency braking operation is needed by applying the braking force more than the corresponding braking operation amount by the driver of the vehicle.

When such automatic braking control is needed, the vehicle posture control portion 63 sets the target wheel cylinder pressure Pwg in response to the type of automatic braking control and instructs the set target wheel cylinder pressure Pwg to the target wheel cylinder pressure setting portion 61. The pressure increasing and decreasing characteristics selecting portion 64 selects the pressure increasing characteristic when the instruction by the vehicle posture control portion 63 is a demand for increasing the pressure of the target wheel cylinder pressure Pwg, even during the operation judgment period and selects the pressure decreasing characteristic when the instruction by the vehicle posture control portion 63 is a demand for decreasing the pressure of the target wheel cylinder pressure Pwg, even during the operation judgment period. Accordingly, the braking force requested by the vehicle posture control portion 63 can be secured to achieve the vehicle posture control.

Figure 8:
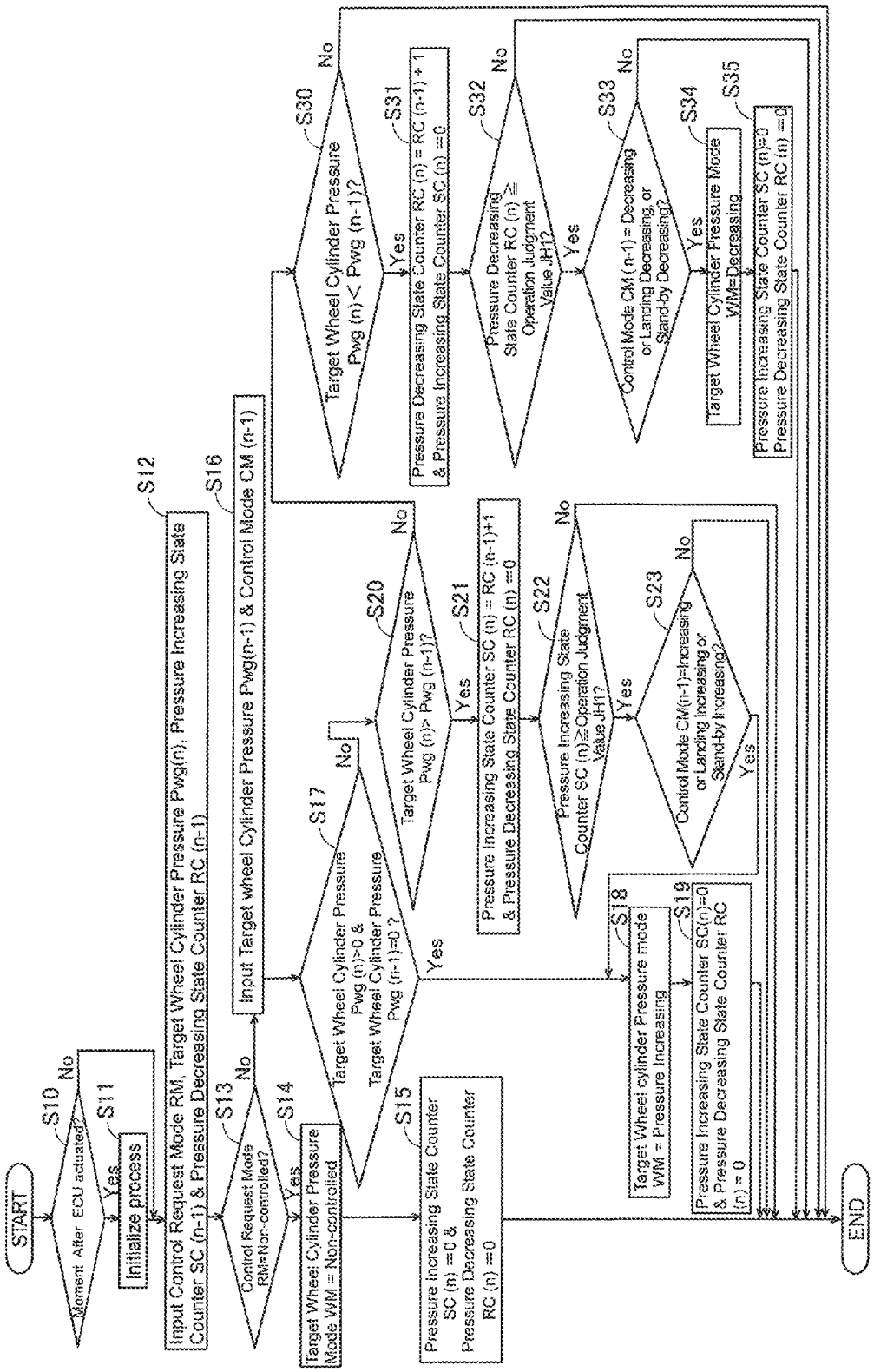
FIG. 8 is a time flowchart of an example of mode judgment process for the target wheel cylinder pressure Pwg according to the first embodiment.

The brake ECU 6 includes a microprocessor including CPU and Memory (not shown) and the hydraulic pressure braking control is performed by executing the program stored in the memory. The hydraulic pressure braking control is performed repeatedly at every predetermined period passed. According to the hydraulic pressure braking control operation, the mode of the target wheel cylinder pressure Pwg is judged whether the target wheel cylinder pressure Pwg is in the pressure increasing tendency or in the pressure decreasing tendency and the output servo pressure Pso is set based on the judgment. First, the mode judgment of the target wheel cylinder pressure Pwg will be explained hereinafter. FIG. 8 is an example of the flowchart for judging procedure of the target wheel cylinder pressure Pwg.

First, at the step S10, whether the timing is immediately after the brake ECU 6 was activated or not is judged. The timing that immediately after the brake ECU 6 was activated is the timing that this judgment program is firstly processed and the timing that the repeated processing is not included in this timing. Immediately after the brake ECU 6 was activated (in case of "Yes"), the program goes to the step S11. If the timing is not immediately after the activation of the brake ECU 6 ("No" at the step S10), then the program goes to the step S12. At the step S11, an initialization is processed. Mainly the variables are initialized at the step S11.

At the step S12, the conditions of the control request mode RM, the target wheel cylinder pressure Pwg (n), the pressure increasing state counter SC (n−1) and the pressure increasing state counter RC (n−1) are inputted. The request mode RM has two modes, linear mode and REG mode to allow or prohibit the hydraulic pressure braking control. In detail, when the request mode RM is in linear mode, the hydraulic pressure braking control is allowed and when the request mode RM is in REG mode, the hydraulic pressure braking control is prohibited. In other words, when the request mode RM is in REG mode, the hydraulic pressure braking control is not performed (non-controlled state).

The target wheel cylinder pressure Pwg (n) indicates the target wheel cylinder pressure Pwg at the processing of this step. The later explained target wheel cylinder pressure Pwg (n−1) indicates the target wheel cylinder pressure Pwg at the processing of previous step. The expressions (n) and (n−1) used for the variables indicate the same meaning through the steps and are used for the other later explained variables. The pressure increasing state counter SC indicates the counter by which the pressure increasing state or not is judged. Similarly, the pressure decreasing state counter RC indicates the counter by which the pressure decreasing state or not is judged.

Next, at the step S13, whether the control request mode RM is in "non-controlled state" or not is judged. In other words, when the control request mode RM is in REG mode (i.e., "Yes" at the step S13), the program goes to the step S14. At the step S14, the target wheel cylinder pressure mode WM is set to the "non-controlled state" and the program goes to the step S15. The target wheel cylinder pressure mode WM indicates the three states, "pressure increasing state", "pressure decreasing state" and "non-controlled state". These states indicate that the target wheel cylinder pressure Pwg is in either "the pressure increasing tendency", "the pressure decreasing tendency" or "the pressure being not controlled" At the next step S15, the pressure increasing state counter SC (n) and the pressure decreasing state counter RC (n) are cleared to be zero (0) and this routine program ends.

Figure 9:
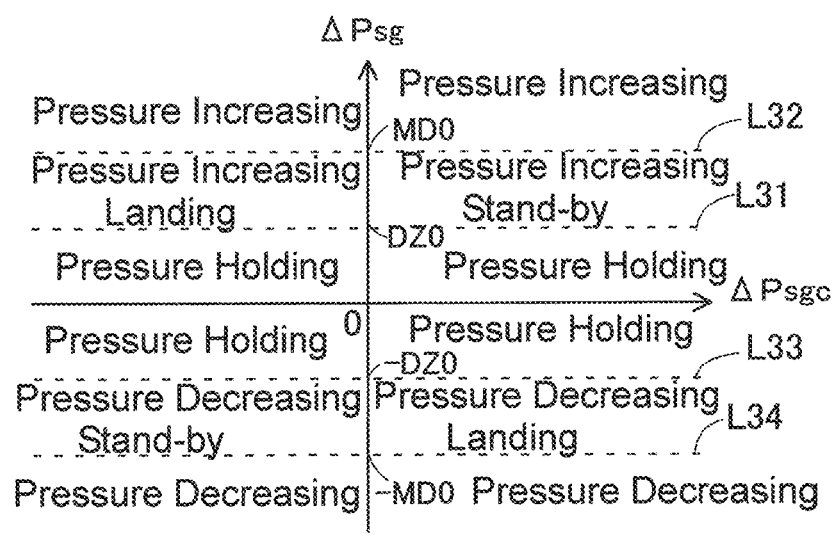
FIG. 9 is an explanatory view showing an example of a relationship among the target servo pressure deviation gradient $\Delta Psgc$, the target servo pressure deviation $\Delta Psg$ and the control mode CM.

At the step S13, if the control request mode RM is in linear mode ("no" at the step S13), the program goes to the step S16. At the step S16, the states of the target wheel cylinder pressure Pwg (n−1) and the control mode CM (n−1) are inputted. The control mode CM indicates eight states, "pressure increasing", "pressure increasing closing", "pressure increasing stand-by", "pressure holding", "pressure decreasing stand-by", "pressure decreasing closing", "pressure decreasing" and "pressure non-controlled". FIG. 9 is an explanatory view indicating an example of the relationship among the target servo pressure deviation inclination ΔPsgc, the target servo pressure deviation ΔPsg and the control mode CM. The horizontal axis indicates the target servo pressure deviation inclination ΔPsgc and the vertical axis indicates the target servo pressure deviation ΔPsg. The dotted straight lines L31 through L34 indicate the boundaries of the control mode CM for each state.

Each mode in the control mode CM is set based on the target servo pressure deviation ΔPsg and the target servo pressure deviation inclination ΔPsgc. The value of the target servo pressure deviation ΔPsg is the value obtained by subtracting the actual servo pressure Ps from the target servo pressure Psg. The target servo pressure deviation inclination ΔPsgc is an amount of change per unit of time of the target servo pressure deviation ΔPsg. For example, if the target servo pressure deviation ΔPsg increases with positive values or decreases with negative values, the value of the target servo pressure deviation inclination ΔPsgc is positive. However, on the other hand, if the target servo pressure deviation ΔPsg decreases with positive values or increases with negative values, the value of the target servo pressure deviation inclination ΔPsgc is negative.

First, the target servo pressure deviation ΔPsg represented by the positive value will be considered hereinafter. Under this situation, if the value of the target servo pressure deviation ΔPsg is smaller than a predetermined dead zone threshold value DZ0, the control mode CM is set to the pressure holding state and if the value of the target servo pressure deviation ΔPsg is larger than a predetermined mode threshold value MD0, the control mode CM is set to the pressure increasing state. The line L31 indicates the target servo pressure deviation ΔPsg at the dead zone threshold value DZ0 being a constant value. The line L32 indicates the target servo pressure deviation ΔPsg at the mode threshold value MD0 being a constant value.

When the target servo pressure deviation ΔPsg is larger than the predetermined dead zone threshold value DZ0 and smaller than the predetermined mode threshold value MD0 and the target servo pressure deviation inclination ΔPsgc is positive value, the control mode CM is set to the pressure increasing stand-by state. When the target servo pressure deviation ΔPsg is larger than the predetermined dead zone threshold value DZ0 and smaller than the predetermined mode threshold value MD0 and the target servo pressure deviation inclination ΔPsgc is negative value, the control mode CM is set to the pressure increasing landing state.

Next, the target servo pressure deviation ΔPsg represented by the negative value will be considered hereinafter. Under this situation, if the value of the target servo pressure deviation ΔPsg is larger than a predetermined dead zone threshold value (−DZ0), the control mode CM is set to the pressure holding state and if the value of the target servo pressure deviation ΔPsg is smaller than a predetermined mode threshold value (−MD0), the control mode CM is set to the pressure decreasing state. The line L33 indicates the target servo pressure deviation ΔPsg at the dead zone threshold value (−DZ0) being a constant value. The line L34 indicates the target servo pressure deviation ΔPsg at the mode threshold value (−MD0) being a constant value.

When the target servo pressure deviation ΔPsg is larger than the predetermined mode threshold value (−MD0) and smaller than the predetermined dead zone threshold value (−DZ0) and the target servo pressure deviation ΔPsg is positive value, the control mode CM is set to the pressure decreasing landing state. When the target servo pressure deviation ΔPsg is larger than the predetermined mode threshold value (−MD0) and smaller than the predetermined dead zone threshold value (−DZ0) and the target servo pressure deviation inclination ΔPsgc is a negative value, the control mode CM is set to the pressure decreasing stand-by state.

At the next step S17, whether or not the target wheel cylinder pressure Pwg (n) is bigger than zero (0) and whether or not the target wheel cylinder pressure Pwg (n−1) is zero (0) are judged. If these conditions are satisfied ("Yes" in the step S17), the program goes to the step S18. At the step s18, the target wheel cylinder pressure mode WM is set to the pressure increasing state. At the next step S19, the pressure increasing state counter SC (n) and the pressure decreasing state counter RC (n) are cleared to be zero (0) and the routine temporarily ends. In other words, when rising of the target wheel cylinder pressure Pwg, the target wheel cylinder pressure mode WM is set to the pressure increasing state.

When the conditions are not satisfied at the step S17 ("No" in the step S17), the program goes to the step S20. At the step S20, whether or not the target wheel cylinder pressure Pwg (n) is larger than Pwg (n−1) is judged. If the target wheel cylinder pressure Pwg (n) of this time is increased compared to the previous time target wheel cylinder pressure Pwg (n−1), ("Yes") the program goes to the step S21. At the step s21, the previous time pressure increasing state counter SC (n−1) is added by one (1) to be the this time pressure increasing state counter being SC (n) and the pressure decreasing state counter RC (n) is cleared to be zero (0).

Next, at the step S22, whether or not the pressure increasing state counter SC (n) is equal to or more than an operation judgment value JH1 is judged. The operation judgment value JH1 corresponds to the operation judgment period and is, for example, set to 10. When the conditions are satisfied ("Yes" at the step S22), the pressure increasing tendency of the target wheel cylinder pressure Pwg continues for the operation judgment value JH1 (for continuous ten times) and then program goes to the step S23. At the step S23, whether or not the control mode CM (n−1) is in the pressure increasing, pressure increasing landing or the pressure increasing stand-by is judged.

In the pressure increasing landing state, the control current to the pressure increasing calve 42 is gradually reduced immediately before the servo pressure Ps goes into the control dead zone of the target servo pressure Psg. By suppressing the increase of the servo pressure Ps, the servo pressure Ps is approximated to agree with the target servo pressure Psg. The servo pressure Ps is detected by the hydraulic pressure sensor 73. In the pressure increasing stand-by state, the values of the servo pressure Ps and the target servo pressure Psg are approximately the same and when the servo pressure Ps is in the control dead zone of the target servo pressure Psg, the preparation is made to start pressure increasing of the servo pressure Ps. In the pressure increasing stand-by state, when the target servo pressure Psg starts gradual increase, the pressure increasing valve 42 slightly opens. In detail, the pressure increasing valve 42 opens so that the pilot pressure Pi increases slightly but not to increase the servo pressure Ps.

When the conditions are satisfied at the step S23 ("Yes" at the step S23), the program goes to the steps S18 and S19. In other words, the target wheel cylinder pressure mode WM is set to the pressure increasing state and the pressure increasing state counter SC (n) is cleared to be zero (0). Thus, the routine temporarily ends. When the conditions are not satisfied at the step S22 or S23 ("No" at the steps S22 or S23), the routine temporarily ends.

When the conditions are not satisfied at the step S20 ("No" at the step S20), the program goes to the step S30. At the step S30, whether or not the target wheel cylinder pressure Pwg (n) is smaller than the target wheel cylinder pressure Pwg (n−1) is judged. If the target wheel cylinder pressure Pwg (n) of this time is decreased compared to the previous time target wheel cylinder pressure Pwg (n−1), ("Yes" at the step S30), the program goes to the step S31. At the step S31, the previous time pressure decreasing state counter RC (n−1) is added by one (1) to be the this time pressure decreasing state counter being RC (n) and the pressure increasing state counter SC (n) is cleared to be zero (0).

Next, at the step S32, whether or not the pressure decreasing state counter RC (n) is equal to or more than the operation judgment value JH1 is judged. When the conditions are satisfied ("Yes" at the step S32), the pressure decreasing tendency of the target wheel cylinder pressure Pwg continues for the operation judgment value JH1 (for continuous ten times) and then program goes to the step S33. It is noted here that the operation judgment value JH1 at the step S32 can be set to a value different from the operation judgment value JH1 at the step S22. At the step S33, whether or not the control mode CM (n−1) is in the pressure decreasing, pressure decreasing landing or the pressure decreasing stand-by is judged.

In the pressure decreasing landing state, the control current to the pressure decreasing valve 41 is gradually reduced immediately before the servo pressure Ps goes into the control dead zone of the target servo pressure Psg. By gradually decreasing the servo pressure Ps, the servo pressure Ps is approximated to agree with the target servo pressure Psg. The servo pressure Ps is detected by the hydraulic pressure sensor 73. In the pressure decreasing stand-by state, the values of the servo pressure Ps and the target servo pressure Psg are approximately the same and when the servo pressure Ps is in the control dead zone of the target servo pressure Psg, the preparation is made to start pressure decreasing of the servo pressure Ps. In the pressure decreasing stand-by state, when the target servo pressure Psg starts gradual decrease, the pressure decreasing valve 41 slightly opens. In detail, the pressure decreasing valve 41 opens so that the pilot pressure Pi decreases slightly but not to decrease the servo pressure Ps.

When the conditions are satisfied at the step S33 ("Yes" at the step S33), the program goes to the steps S34 and S35. In other words, the target wheel cylinder pressure mode WM is set to the pressure decreasing state at the step S34 and the pressure increasing state counter SC (n) and the pressure decreasing state counter RC (n) are cleared to be zero (0) at the step S35. Thus, the routine temporarily ends. When the conditions are not satisfied at the step S30, S32 or S33 ("No" at the steps S30, S32 or S33), the routine temporarily ends.

Figure 10:
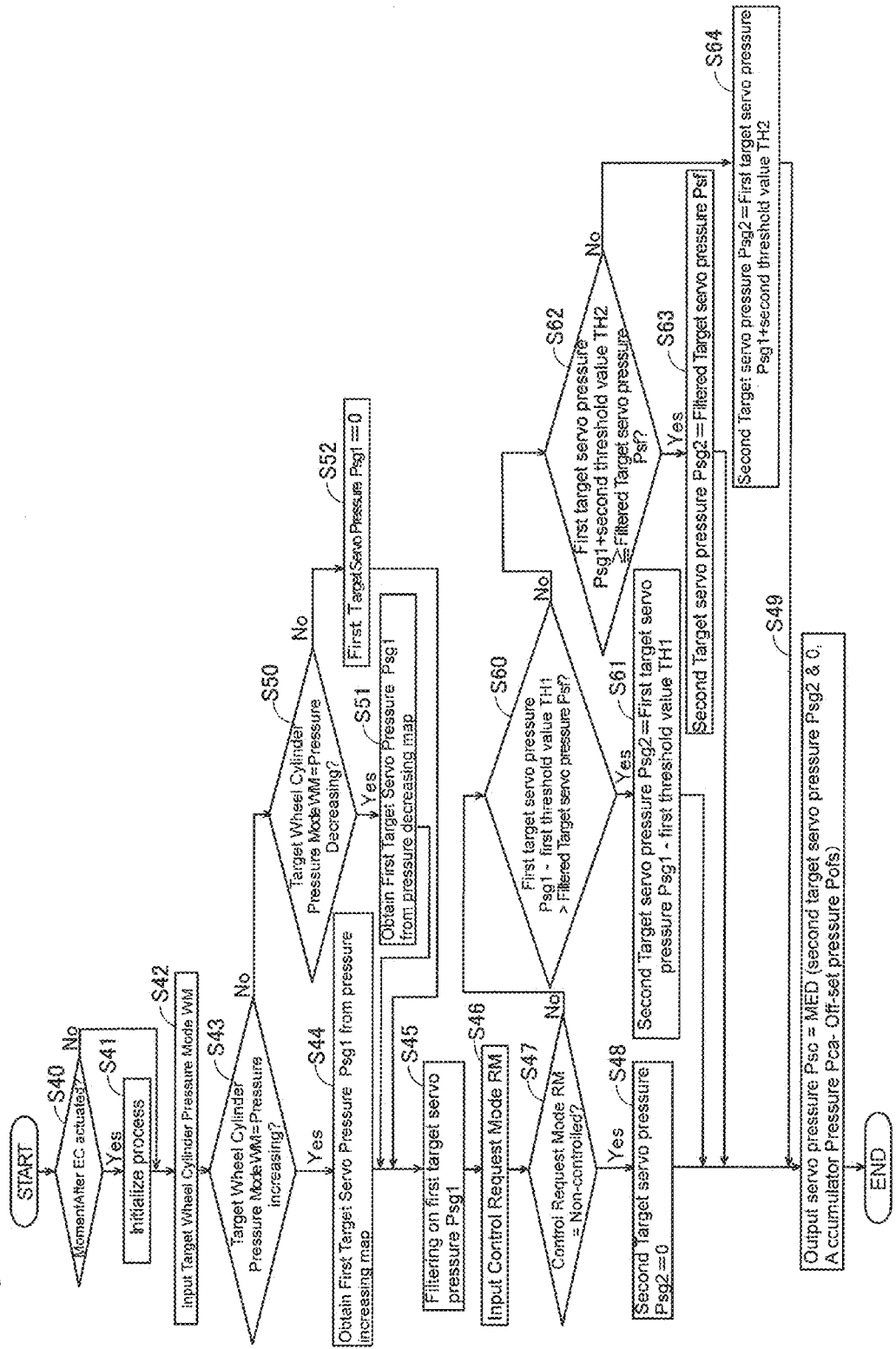
FIG. 10 is a flowchart of an example of process for setting the output servo pressure Pso.

Next, at the hydraulic pressure braking control operation, the output servo pressure Pso is set based on the mode judgment result of the target wheel cylinder pressure Pwg. FIG. 10 is an example of a flowchart showing the process of output servo pressure setting.

At the step S40, whether the timing is immediately after the brake ECU 6 was activated or not is judged. In other words, whether or not the process is firstly executed. Immediately after the brake ECU 6 was activated (in case of "Yes"), the program goes to the step S41. If the timing is not immediately after the activation of the brake ECU 6 ("No" at the step S40), then the program goes to the step S42. At the step S41, an initialization is processed. Mainly the variables are initialized at the step S41. At the step S42, the target wheel cylinder pressure mode WM state is inputted.

At the next step S43, whether or not the target wheel cylinder pressure mode WM is in pressure increasing mode is judged. If the target wheel cylinder pressure mode WM is in pressure increasing mode ("Yes" at the step S43), the program goes to the step S44 and at the step S44, the first target servo pressure Psg1 is obtained from the pressure increasing map and then the program goes to the step S45.

The target wheel cylinder pressure Pwg relative to the pedal stroke amount "str" is calculated from, for example, the relationship between the pedal stroke amount str and the target wheel cylinder pressure Pwg as shown in FIG. 7. The first servo pressure Psg1 relative to the target wheel cylinder pressure Pwg is obtained from the pressure increasing map. The pressure increasing map is for example, indicated by the line L10 in FIG. 3. This map is prepared in advance and stored in the memory.

When the conditions are not satisfied at the step S43 ("No" at the step S43), the program goes to the step S50. At the step S50, whether or not the target wheel cylinder pressure mode WM is in pressure decreasing mode is judged. If the target wheel cylinder pressure mode WM is in pressure decreasing mode ("Yes" at the step S50), the program goes to the step S51 and at the step S51, the first target servo pressure Psg1 is obtained from the pressure decreasing map and then the program goes to the step S45.

As similar to the step S44, the target wheel cylinder pressure Pwg relative to the pedal stroke amount "str" is calculated and the first servo pressure Psg1 relative to the target wheel cylinder pressure Pwg is obtained from the pressure decreasing map. The pressure decreasing map is for example, indicated by the line L11 in FIG. 3. This map is prepared in advance and stored in the memory. If the conditions are not satisfied at the step S50 ("No" at the step S50), the program goes to the step S52. At the step S53, the first servo pressure Psg1 is cleared to be zero (0) and the program goes to the step S45.

At the step s45, the first target servo pressure Psg1 is filtered. This filtering process is performed by using a well-known primary low pass filter (digital filter). The cut-off frequency wave is 30 Hz. Thus filtered first target servo pressure is set to be the filtered first target servo pressure Psf. At the next step S46, the control request mode RM is inputted and proceeds to the next step S47.

At the step S47, whether or not the control request mode RM is in "non-controlled" state. If the control request mode RM is in the non-controlled state ("Yes" at the step S47), the program goes to the step S48. At the step s48, the second target servo pressure Psg2 is set to be "zero" and the program goes to the step S49. At the step S49, three hydraulic pressure values are calculated, one hydraulic pressure value by subtracting an off-set pressure Pofs from the second target servo pressure Psg2, a second hydraulic pressure value by subtracting the off-set pressure Pofs from another second target servo pressure "0" and a third hydraulic pressure value by subtracting the off-set pressure Pofs from the accumulator pressure Pac and then the median value among the three hydraulic pressure values is calculated and the output servo pressure Pso is set based on the result of the calculations.

The calculation result "0" indicates the lower limit value of the servo pressure Ps which can decrease the braking hydraulic pressure by connecting with the reservoir 171. The off-set pressure Pofs indicates a margin for the accumulator pressure Pac. For example, the margin or the off-set pressure value Pofs is determined considering the deviation of the detected values of the accumulator pressure by the hydraulic pressure sensor 74. In other words, the hydraulic pressure value which is calculated by subtracting the off-set pressure Pofs from the accumulator pressure Pac indicates the upper limit value of the servo pressure Ps which can be supplied by the accumulator 431. Accordingly, the second target servo pressure Psg2 is controlled to be limited to a hydraulic pressure range that can be controllable by the accumulator 431 and is set as the output servo pressure Pso.

When the conditions are not satisfied at the step S47 ("No" at the step S47), the program goes to the step S60. At the step S60, whether or not the hydraulic pressure calculated by subtracting the first threshold value TH1 from the first target servo pressure Psg1 is greater than the filtered target servo pressure Psf is judged. The first threshold value TH1 is determined considering the hysteresis HY1 as shown in FIG. 3. For example, the first threshold value TH1 is set to be the half value of the hysteresis HY1. When the conditions are satisfied at the step S60 ("Yes" at the step S60), the program goes to the step S61. At the step S61, the second target servo pressure Psg2 is set by subtracting the first threshold value TH1 from the first target servo pressure Psg1. The pressure obtained by subtracting the first threshold value Th1 from the first target servo pressure Psg1 corresponds to the first output servo pressure Pso1. At the step S49, the hydraulic pressure (first output servo pressure Pso1) obtained by subtracting the first threshold value TH1 from the first target servo pressure Psg1 is controlled to be limited to a hydraulic pressure range that can be controllable by the accumulator 431 and is set as the output servo pressure Pso.

When the conditions are not satisfied at the step S60 ("No" at the step S60), the program goes to the step S62. At the step S62, whether or not the hydraulic pressure calculated by adding the second threshold value TH2 to the first target servo pressure Psg1 is equal to or greater than the filtered target servo pressure Psf is judged. The second threshold value TH2 is determined considering the hysteresis HY1 as shown in FIG. 3. For example, the second threshold value TH2 is set to be the half value of the hysteresis HY1. The second threshold value TH2 may be determined as the value different from the first threshold value TH1. When the conditions are satisfied at the step S62 ("Yes" at the step S62), the program goes to the step S63. At the step S63, the second target servo pressure Psg2 is set by the filtered target servo pressure Psf and the program goes to the step S49. At the step S49, the filtered target servo pressure Psf is controlled to be limited to a hydraulic pressure range that can be controllable by the accumulator 431 and is set as the output servo pressure Pso.

Figure 11:
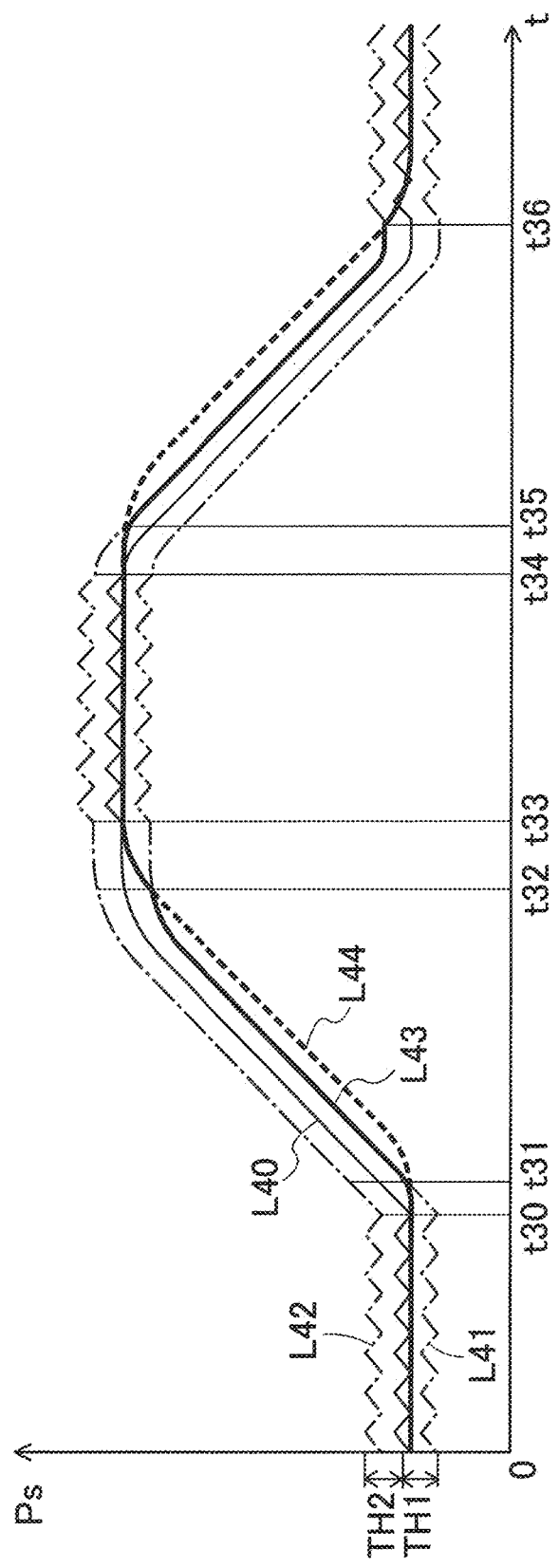
FIG. 11 is an explanatory view of an example of a process for setting the output servo pressure Pso. And, FIG. 12 is a time flowchart of an example of mode judgment process for the target wheel cylinder pressure Pwg according to the second embodiment.

At the step S62, if the conditions are not satisfied ("No" at the step S62), the program goes to the step S64 and at the step S64, the pressure calculated by adding the second threshold value TH2 to the first target servo pressure Psg1 is set to be the second target servo pressure Psg2 and the program goes to the step S49. The pressure calculated by adding the second threshold value TH2 to the first target servo pressure Psg1 corresponds to the second output servo pressure Pso2. At the step S49, this hydraulic pressure (second output servo pressure Pso2) obtained by adding the second threshold value TH2 to the first target servo pressure Psg1 is controlled to be limited to a hydraulic pressure range that can be controllable by the accumulator 431 and is set as the output servo pressure Pso FIG. 11 is an explanatory view of an example of change over time of the output servo pressure Pso. The horizontal axis indicates the time "t" and the vertical axis indicates the servo pressure Ps. The curved line L40 indicates the first target servo pressure Psg1 which changes over time. The curved line L41 indicates the change over time of the first output servo pressure Pso1. The curved line L42 indicates the change over time of the second output servo pressure Pso2. The curved line L43 indicates the change over time of the output servo pressure Pso and the curved line L44 indicates the change over time of the filtered target servo pressure Psf.

The values of the first target servo pressure Psg1, the first output servo pressure Pso1 and the second output servo pressure Pso2 (curved lines L40, L41 and L42) are periodically changing with a small amplitude from the time "zero" until the time "t30". This indicates that the target wheel cylinder pressure Pwg is changing due to the variation of the pedal stroke and noises. It is noted that the value of the filtered target servo pressure Psf which has been obtained by filtering the first target servo pressure Pso1 is larger than the value of the first output servo pressure Psg1 and smaller than the value of the second output servo pressure Pso2. Accordingly, the output servo pressure Pso is set to the filtered target servo pressure Psf (curved line L43, step S63).

Assuming that the driver of the vehicle depresses the pedal to increase the pedal stroke amount "str" from the time "t30" until the time "t33", the target wheel cylinder pressure Pwg increases in accordance with the increase of the pedal stroke "str" and the first target servo pressure Psg1, the first target output servo pressure Pso1 and the second target output servo pressure Pso2 respectively increase (curved lines L40, L41 and L42). The filtered target servo pressure Psf increases with a little time delay from the increases of the first target servo pressure Psg1, the first target output servo pressure Pso1 and the second target output servo pressure Pso2 (curved line L44). The filtered target servo pressure Psf is larger than the first output servo pressure Pso1 and smaller than the second output servo pressure Pso2 from the time "t30"until the time "t31". Therefore, the filtered target servo pressure Psf is set to be the output servo pressure Pso (curved line L43).

At the time "t31", the value of the filtered target servo pressure Psf becomes equal to the value of the first output servo pressure Pso1 and the filtered target servo pressure Psf becomes smaller than the first output servo pressure Pso1 from the time "t31" until the time "t32". Therefore, the output servo pressure Pso is set to be the first output servo pressure Pso1 (curved line L43 and step S61).

At the time "t32", the value of the filtered target servo pressure Psf becomes equal to the value of the first output servo pressure Pso1 and the filtered target servo pressure Psf becomes larger than the value of the first output servo pressure Pso1 and smaller than the second output servo pressure Pso2 from the time "t32" until the time "t34". Therefore, the output servo pressure Pso is set to be the filtered target servo pressure Psf (curved line L43 and step S63). It is noted that from the time "t33" until the time "t34", the pedal stroke amount "str" keeps approximately constant value and the first output servo pressure Pso1 and the second output servo pressure Pso2 (curved lines L40, L41 and L42) change periodically with a small amplitude.

Next, Assuming that the pedal stroke amount "str" decreases from the time "t34" until the time "t36", the target wheel cylinder pressure Pwg decreases in accordance with the decrease of the pedal stroke "str" and the first target servo pressure Psg1, the first target output servo pressure Pso1 and the second target output servo pressure Pso2 respectively decrease (curved lines L40, L41 and L42). The filtered target servo pressure Psf decreases with a little time delay from the decreases of the first target servo pressure Psg1, the first target output servo pressure Pso1 and the second target output servo pressure Pso2 (curved line L44). The filtered target servo pressure Psf is larger than the first output servo pressure Pso1 and smaller than the second output servo pressure Pso2 from the time "t34" until the time "t35". Therefore, the filtered target servo pressure Psf is set to be the output servo pressure Pso (curved line L43).

At the time "t35", the value of the filtered target servo pressure Psf becomes equal to the value of the second output servo pressure Pso2 and the filtered target servo pressure Psf becomes larger than the second output servo pressure Pso2 from the time "t35" until the time "t36". Therefore, the output servo pressure Pso is set to be the second output servo pressure Pso2 (curved line L43 and step S64).

At the time "t36", the value of the filtered target servo pressure Psf becomes larger than the value of the first output servo pressure Pso1 and smaller than the second output servo pressure Pso2. Therefore, the output servo pressure Pso is set to be the filtered target servo pressure Psf (curved line L43 and step S63). It is noted that after the time "t36", the pedal stroke amount "str" keeps approximately constant value and the first output servo pressure Pso1 and the second output servo pressure Pso2 (curved lines L40, L41 and L42) change periodically again with a small amplitude.

From the time "t0" to the time "t30", from the time "t33" to the time "t34" and after the time "t36", the target wheel cylinder pressure Pwg is not in the continuous pressure increasing tendency or in continuous pressure decreasing tendency. Accordingly, in these time periods, there is no pressure increasing and decreasing characteristics selections by the pressure increasing and decreasing characteristics selecting portion 64. This can prevent unnecessary changing over operation between the pressure increasing and decrease selections due to a periodical change of the target wheel cylinder pressure Pwg.

Further, since the deviation between the target servo pressure Psg and the filtered target servo pressure Psf is small, the output servo pressure setting portion 65 sets the filtered target servo pressure Psf as the output servo pressure Pso. This can prevent an erroneous setting caused by the noise that the pressure decreasing side target servo pressure Psg which had been properly the pressure increasing side target servo pressure Psg is set as the output servo pressure Pso. The reverse setting of the output servo pressure Pso between the pressure increasing side and the pressure decreasing side target servo pressure Psg can be prevented.

The target wheel cylinder pressure Pwg between the time "t30" and the time "t33" is in a continuous pressure increasing tendency and accordingly, the pressure increasing and decreasing characteristics selecting portion 64 selects the pressure increasing characteristic and from the time "t31" until the time "t32", since the deviation between the target servo pressure Psg and the filtered target servo pressure Psf is large, the output servo pressure setting portion 65 sets the first output servo pressure Pso1 as the output servo pressure Pso. This can prevent braking control delay.

The target wheel cylinder pressure Pwg between the time "t34" and the time "t36" is in a continuous pressure decreasing tendency and accordingly, the pressure increasing and decreasing characteristics selecting portion 64 selects the pressure decreasing characteristic and from the time "t35" until the time "t36", since the deviation between the target servo pressure Psg and the filtered target servo pressure Psf is large, the output servo pressure setting portion 65 sets the second output servo pressure Pso2 as the output servo pressure Pso. This can prevent braking control delay.

It is noted that at the time "t31", "t32", "t35" and the time "t36" the output servo pressure Pso is smoothly changed without having any steps.

(2) Second Embodiment

Figure 12:
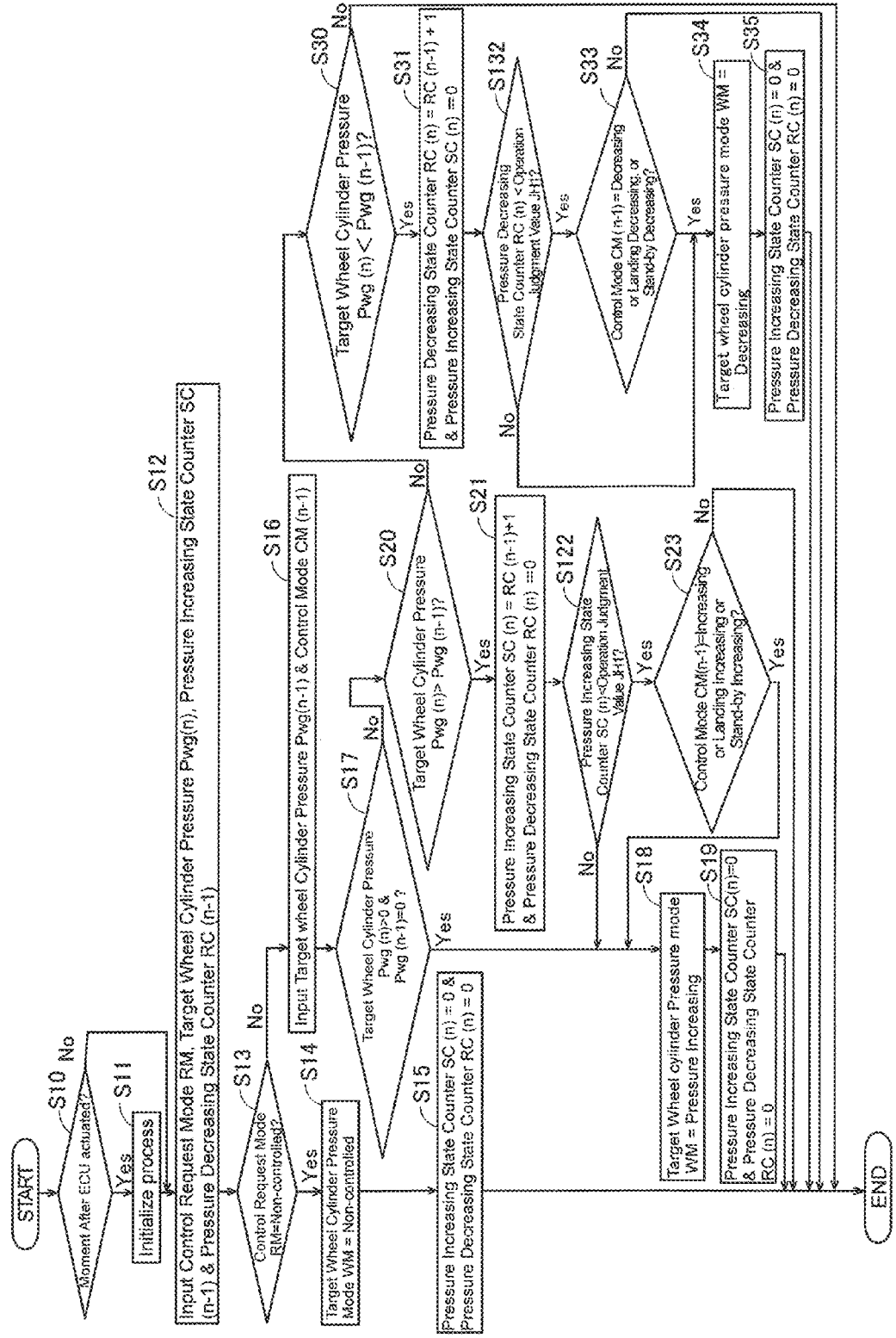

The process of mode judgment of the target wheel cylinder pressure Pwg according to the second embodiment is different from that of the first embodiment. The portions common to both embodiments are referenced as the same numerals/symbols and duplicated explanation can be omitted. FIG. 12 is a flowchart indicating an example of the process for mode judgment of the target wheel cylinder pressure Pwg. The step S122 corresponds to the step S22 of the first embodiment and the step S132 corresponds to the step S32 of the first embodiment.

At the step S122, whether or not the pressure increasing state counter SC (n) is less than an operation judgment value JH1 is judged. When the conditions are not satisfied ("No" at the step S122), the pressure increasing tendency of the target wheel cylinder pressure Pwg continues for the operation judgment value JH1 and then program goes to the step S18 and step S19. In other words, the target wheel cylinder pressure mode WM is set to be the pressure increasing and the pressure increasing state counter SC(n) and the pressure decreasing state counter RC (n) are cleared to be zero and temporarily the routine program ends.

At the step S122, if the conditions are satisfied ("Yes" at the step S122), it indicates that the target wheel cylinder pressure Pwg does not continuously keep the pressure increasing tendency for the operation judgment value JH1. In this case, the program goes to the step S23. At the step S23, whether or not the control mode CM (n−1) is in the pressure increasing, pressure increasing landing or the pressure increasing standby is judged.

Next, at the step S132, whether or not the pressure decreasing state counter RC (n) is less than the operation judgment value JH1 is judged. When the conditions are not satisfied ("No" at the step S132), the pressure decreasing tendency of the target wheel cylinder pressure Pwg continues for the operation judgment value JH1. Then program goes to the steps S34 and S35. In other words, the target wheel cylinder pressure mode WM is set to be the pressure decreasing and the pressure increasing state counter SC(n) and the pressure decreasing state counter RC (n) are cleared to be zero and temporarily the routine program ends.

At the step S132, if the conditions are satisfied ("Yes" at the step S132), it indicates that the target wheel cylinder pressure Pwg does not continuously keep the pressure decreasing tendency for the operation judgment value JH1. In this case, the program goes to the step S33. At the step S33, whether or not the control mode CM (n−1) is in the pressure decreasing, pressure decreasing landing or the pressure decreasing standby is judged.

According to the first embodiment, the target wheel cylinder pressure mode WM is changed over based on the judgment whether or not the pressure increasing or decreasing tendency continues for the operation judgment value JH1 and the control mode CM. This can effectively prevent the control hunting relative to the target wheel cylinder pressure Pwg variation. On the other hand while the tendency of pressure increasing or decreasing is very strong, if the target wheel cylinder pressure Pwg changes with a short cycle, the target wheel cylinder pressure does not continue for the operation judgment value JH1 and the target wheel cylinder pressure mode WM does not change over to control with the same single characteristic.

According to this second embodiment, the target wheel cylinder pressure mode WM is changed over based on the judgment whether or not the pressure increasing or decreasing tendency continues for the operation judgment value JH1 or the control mode CM. Accordingly, while the tendency of pressure increasing or decreasing is very strong, if the target wheel cylinder pressure Pwg changes with a short cycle, the pressure increasing or decreasing tendency of the target wheel cylinder pressure Pwg can be surely detected. It is noted that the value of the dead zone threshold DZ0 can be preferably set to the threshold value that cannot be easily exceeded by the variation of the normal target wheel cylinder pressure Pwg generated when the wheel cylinder pressure is tried to be held.

According to the embodiment, since the judgment is made whether or not the target wheel cylinder pressure Pwg is in pressure increasing tendency or decreasing tendency continuously for the operation judgment value JH1, the changeover operation of the target wheel cylinder pressure mode WM between the pressure increasing and decreasing characteristics, which might be occurred due to a trivial change of the target wheel cylinder pressure Pwg within less than the dead zone threshold value DZ0, can be prevented thereby to prevent occurrence of control hunting.

(3) Others:

The invention is not limited only to the embodiments described above and the attached drawings but to include any modifications or variations as far as such are within the subject matter of the invention. For example, when the ABS control is not necessary for implementing the invention, the ABS actuator 53 can be omitted and even in the case when the ABS control is necessary, the structures and functions are not limited to the embodiments explained above. For example, an actuator (not shown) is provided at the downstream side of the holding valve 531 (at the wheel cylinder 541 through 544 side) for controlling the master pressure Pm to be in further increasing or in further decreasing tendency. In this modification, the actuator, for example, includes a cylinder and a piston and the driving of the piston is controlled by the brake ECU 6. Further, instead of using the stroke sensor 72, a pedal depression sensor 71 can be used for controlling of the brake ECU 6 using the brake pedal depression force instead of pedal stroke amount "str. Still further, both stroke sensor and pedal depression sensor can be used.

[Reference Signs List]

1; master cylinder, 11; main cylinder, 111; inner wall portion, 12; 14; first master piston (master piston), 15; second master piston (master piston), 1A; servo chamber, 1D; first hydraulic pressure chamber (master chamber), 1E; second hydraulic pressure r chamber (master chamber), 4; servo pressure generating device, 541, 542, 543 and 544; wheel cylinder, 6; brake ECU, 61; target wheel cylinder pressure setting portion, 62; target servo pressure setting portion, 63; vehicle posture control portion, 64; pressure increasing or decreasing characteristic selecting portion and 65; output servo pressure setting portion.

The invention claimed is:

1. A brake control device for a vehicle, comprising:
    a master piston slidably and liquid-tightly engaged with a main cylinder of a master cylinder and forming a master chamber together with the main cylinder to supply a plurality of wheel cylinders with a master pressure;
    a servo pressure generating device generating a servo pressure necessary for generating the master pressure in the master chamber by supplying a generated servo pressure to a servo chamber formed between the master piston and an inner wall portion of the main cylinder and biasing the master piston forwardly;
    a target wheel cylinder pressure setting portion for setting a target wheel cylinder pressure which is a target value of the master pressure; and
    a target servo pressure setting portion for setting a target servo pressure necessary for generating the target wheel cylinder pressure, wherein the target servo pressure setting portion includes:
    a pressure increasing or decreasing characteristic selecting portion for selecting a pressure increasing characteristic which defines the servo pressure necessary for increasing the target wheel cylinder pressure and a pressure decreasing characteristic which defines the servo pressure necessary for decreasing the target wheel cylinder pressure; and
    an output servo pressure setting portion for setting an output servo pressure generated by the servo pressure generating device, and wherein the pressure increasing or decreasing characteristic selecting portion selects the pressure increasing characteristic when the target wheel cylinder pressure increases continuously for a predetermined operation judgment period and selects the pressure decreasing characteristic when the target wheel cylinder pressure decreases continuously for a predetermined operation judgment period and the output servo pressure setting portion sets the target servo pressure based on the pressure increasing or decreasing characteristic selected by the pressure increasing or decreasing characteristic selecting portion and the servo pressure generating device generates the servo pressure based on the target servo pressure set by the output servo pressure setting portion.

2. The brake control device for a vehicle according to claim 1, further comprising a vehicle posture control portion which controls a posture of the vehicle by adjusting a vehicle braking force by instructing the target wheel cylinder pressure to the target wheel cylinder pressure setting portion and the pressure increasing or decreasing characteristic selecting portion selects the pressure increasing characteristic although within the predetermined operation judgment period, when the instruction from the vehicle posture control portion requests a pressure increase for the target wheel cylinder pressure and selects the pressure decreasing characteristic although within the predetermined operation judgment period, when the instruction from the vehicle posture control portion requests a pressure decrease for the target wheel cylinder pressure.

3. The brake control device for a vehicle according to claim 1, the pressure increasing or decreasing characteristic selecting portion selects the pressure increasing characteristic when the target wheel cylinder pressure is increased from a zero state.

4. A brake control device for a vehicle, comprising:
a master piston slidably and liquid-tightly engaged with a main cylinder of a master cylinder and forming a master chamber together with the main cylinder to supply a plurality of wheel cylinders with a master pressure;
a servo pressure generating device generating a servo pressure necessary for generating the master pressure in the master chamber by supplying the generated servo pressure to a servo chamber formed between the master piston and an inner wall portion of the main cylinder and biasing the master piston forwardly;
a target wheel cylinder pressure setting portion for setting a target wheel cylinder pressure which is a target value of the master pressure; and
a target servo pressure setting portion for setting a target servo pressure necessary for generating the target wheel cylinder pressure, and wherein the target servo pressure setting portion includes an output servo pressure setting portion for setting an output servo pressure generated by the servo pressure generating device and the output servo pressure setting portion sets the target servo pressure based on the target wheel cylinder pressure and calculates a filtered target servo pressure obtained by filtering the target servo pressure wherein the filtered target servo pressure is set to be the output servo pressure and the servo pressure generating device generates the servo pressure based on the output servo pressure set by the output servo pressure setting portion.

5. The brake control device for a vehicle according to claim 4 wherein the target servo pressure setting portion further includes a pressure increasing or decreasing characteristic selecting portion for selecting a pressure increasing characteristic which defines the servo pressure necessary for increasing the target wheel cylinder pressure and a pressure decreasing characteristic which defines the servo pressure necessary for decreasing the target wheel cylinder pressure, wherein the output servo pressure setting portion sets the target servo pressure based on the target wheel cylinder pressure and the pressure increasing or decreasing characteristic selected by the pressure increasing or decreasing characteristic selecting portion.

6. The brake control device for a vehicle according to claim 4, the output servo pressure setting portion sets a servo pressure calculated based on the target servo pressure as the output servo pressure when a deviation between the target servo pressure and the filtered target servo pressure is equal to or more than a predetermined threshold value and sets the filtered target servo pressure as the output servo pressure when the deviation between the target servo pressure and the filtered target servo pressure is less than the predetermined threshold value.

7. The brake control device for a vehicle according to claim 4, the output servo pressure setting portion calculates the filtered target servo pressure by filtering the target servo pressure using a low pass filter.

* * * * *